(12) United States Patent
Roberge et al.

(10) Patent No.: US 8,682,549 B2
(45) Date of Patent: Mar. 25, 2014

(54) ELECTRONICALLY CONTROLLED CONTINUOUSLY VARIABLE TRANSMISSION WITH TORQUE LIMITING SYSTEM AND METHOD THEREOF

(75) Inventors: Hubert Roberge, Drummondville (CA); David Levasseur, Drummondville (CA); Christian Mercier, Drummondville (CA)

(73) Assignee: CVTech Inc., Drummondville (CA)

( * ) Notice: Subject to any disclaimer, the term of this patent is extended or adjusted under 35 U.S.C. 154(b) by 367 days.

(21) Appl. No.: 12/976,719

(22) Filed: Dec. 22, 2010

(65) Prior Publication Data

US 2011/0153174 A1   Jun. 23, 2011

Related U.S. Application Data

(60) Provisional application No. 61/289,857, filed on Dec. 23, 2009, provisional application No. 61/289,821, filed on Dec. 23, 2009, provisional application No. 61/289,850, filed on Dec. 23, 2009, provisional application No. 61/289,834, filed on Dec. 23, 2009.

(51) Int. Cl.
*B60K 28/00* (2006.01)
*F16H 61/662* (2006.01)

(52) U.S. Cl.
USPC .............................. 701/58; 701/102; 474/11

(58) Field of Classification Search
USPC .......... 701/58, 102; 474/11, 14, 37; 180/54.1, 180/271
See application file for complete search history.

(56) References Cited

U.S. PATENT DOCUMENTS

| 4,344,499 | A | * | 8/1982 | van der Lely et al. ........ 180/197 |
| 4,964,841 | A | | 10/1990 | Takayama et al. |
| 5,692,983 | A | | 12/1997 | Bostelmann |
| 6,811,504 | B2 | | 11/2004 | Korenjak et al. |
| 7,163,477 | B1 | * | 1/2007 | Sherrod ......................... 474/14 |
| 7,207,920 | B2 | | 4/2007 | Jonsson |
| 7,237,638 | B2 | | 7/2007 | Ishikawa |
| 7,771,299 | B2 | | 8/2010 | Mochizuki et al. |

(Continued)

OTHER PUBLICATIONS

TrailBloc driven pulley. http://www.commandertalk.com/engines-drivelines-maintenance/438-finally-pictures-cvtech-clutch.html.

(Continued)

*Primary Examiner* — Tan Q Nguyen
(74) *Attorney, Agent, or Firm* — Mathieu Audet

(57) ABSTRACT

Is provided herein a torque-limiting electronically controlled CVT comprising a drive portion having a drive pulley including two opposed sheaves adapted to be actuated with an electric motor to set a transmission ratio between an engine and a ground contacting rotating member of a vehicle, an input module adapted to receive a signal indicative of whether a ground-contacting rotating member is airborne, a processing module adapted to determine a desired CVT ratio, and an output module adapted to actuate the electric motor to obtain the desired CVT ratio to match the circumferential velocity of the vehicle's airborne ground-contacting rotating member with the speed of the vehicle in order to limit a mechanical peak torque sustained by a drive system of the vehicle. Also provided hereby is a vehicle equipped with the CVT, a kit including such a CVT and a method of managing the CVT to limit the mechanical peak torque sustained by a drive train of a vehicle.

17 Claims, 18 Drawing Sheets

(56) References Cited

U.S. PATENT DOCUMENTS

| | | | |
|---|---|---|---|
| 2002/0173403 A1* | 11/2002 | Kohno et al. | 477/37 |
| 2007/0004552 A1 | 1/2007 | Matsudaira et al. | |
| 2007/0027602 A1 | 2/2007 | Unno et al. | |
| 2007/0054763 A1 | 3/2007 | Mochizuki et al. | |
| 2007/0054764 A1 | 3/2007 | Mochizuki et al. | |
| 2007/0232447 A1* | 10/2007 | Maimone et al. | 477/176 |
| 2008/0108463 A1 | 5/2008 | Unno | |
| 2008/0183350 A1* | 7/2008 | Noguchi | 701/29 |

OTHER PUBLICATIONS

The mathematical gazette—A simple introduction to a hyperstatic structure.

Grand dictionnaire terminologique—Hyperstatic definition (translated from French).

http://www.off-road.com/atv/review/2008-arctic-cat-thundercat-1000-atv-23585.html—2008 Arctic Cat Thundercat 1000 ATV—Spike Load Limiter.

http://www.snow-hawk.com/afficher.aspx?page=72&langue=en—TLS (Torque Limiting System).

* cited by examiner

ELECTRONICALLY CONTROLLED CONTINUOUSLY VARIABLE TRANSMISSION WITH TORQUE LIMITING SYSTEM AND METHOD THEREOF

CROSS-REFERENCE

The present United States patent application relates to and claims priority from U.S. provisional patent application No. 61/289,857, filed Dec. 23, 2009, entitled TORQUE LIMITING SYSTEM AND METHOD, Unites States provisional patent application No. 61/289,821, filed Dec. 23, 2009, entitled POLAR POSITIONABLE CONTINUOUSLY VARIABLE TRANSMISSION, Unites States provisional patent application No. 61/289,834, filed Dec. 23, 2009, entitled GEAR SECURING MECHANISM, KIT AND METHOD THEREOF, and from Unites States provisional patent application No. 61/289,850, filed Dec. 23, 2009, entitled TORQUE TRANSMITTING COUPLING, which all three documents are incorporated herein by reference in their entirety.

TECHNICAL FIELD

The technical field relates to electrically controlled continuously variable transmissions. More precisely, the present technical field relates to electrically controlled continuously variable transmissions using, or including, a torque limiting system and method thereof adapted to reduce the vulnerability of a drive train to momentarily peak torque sustained therein.

BACKGROUND

Continuously variable transmissions (CVTs) are commonly used on a wide range of vehicles, such as small cars or trucks, snowmobiles, golf carts, scooters, all-terrain vehicles (ATV), etc. They often comprise a drive pulley mechanically connected to a motor, a driven pulley mechanically connected to wheels, tracks or caterpillars, possibly through another mechanical device such as a gearbox, a drive train and a trapezoidal drivebelt transmitting torque between the drive pulley and the driven pulley. A CVT changes the ratio within certain limits as required by the operating conditions to yield a desired motor rotational speed for a given driven pulley rotational speed, the latter being generally proportional to the vehicle speed. A CVT may be used with all kinds of motors, for instance internal combustion engines, electric motors, windmills, etc. CVTs can also be used with other machines that are not vehicles.

Each pulley of a CVT comprises two members having opposite conical surfaces, which members are called sheaves. One sheave, sometimes called "fixed sheave", can be rigidly connected to one end of a supporting shaft while the other sheave, sometimes called "movable sheave", can be free to slide and/or rotate with reference to the fixed sheave by means of bushings or the like. The conical surfaces of the sheaves apply an axial force on the drivebelt. Moving the sheaves axially relative to each other changes the drivebelt operating diameter, thus the ratio of the CVT.

In order to transmit the motor torque, an axial force has to be applied in the driving and the driven pulleys. These axial forces can be generated by a plurality of possible mechanisms or arrangements. In a legacy mechanical CVT, the axial force in the drive pulley is often generated using centrifugal weights, spring and ramps. In a legacy driven pulley, this force is often generated using cam surfaces and a spring.

Generally, at a low vehicle speed, the operating diameter of the drivebelt at the drive pulley is minimal and the operating diameter at the driven pulley is maximal. This is referred to as the minimum ratio or the minimum ratio condition since there is the minimum number of rotations or fraction of rotation of the driven pulley for each full rotation of the drive pulley.

As the vehicle speed increases, so does the driven pulley rotational speed. For a given operating condition, a certain motor rotational speed is desired, thus a desired ratio can be calculated. The CVT actuation mechanism is provided to set the CVT to the appropriate ratio.

Generally, when the rotational speed of the drive pulley increases, its movable sheave moves closer to the fixed sheave thereof under the effect of an actuation mechanism, for instance a centrifugal mechanism or another kind of actuation mechanism. This constrains the drivebelt to wind on a larger diameter at the drive pulley. The drivebelt then exerts a radial force on the sheaves of the driven pulley in addition to the tangential driving force by which the torque received from the motor is transmitted. This radial force urges the movable sheave of the driven pulley away from the fixed sheave thereof, thereby constraining the drivebelt to wind on a smaller diameter at the driven pulley. A return force, for instance a return force generated by a spring of the driven pulley and/or by another biasing mechanism, often counterbalances the radial force. It may also be counterbalanced by a force generated by the axial reaction of the torque applied by the drivebelt on the driven pulley, which force often results from the presence of a cam system and/or another biasing mechanism that tend(s) to move the movable sheave towards the fixed sheave as the torque increases. A cam system may comprise a plurality of ramp surfaces on which respective followers can be engaged. The followers can be sliding buttons or rollers, for instance. The set of ramp surfaces or the set of followers is attached to the movable sheave. The other set is directly or indirectly attached to the fixed sheave and is in a torque-transmitting engagement with the main shaft supporting the driven pulley. The closing effect of the cam system on the drivebelt tension is then somewhat proportional to the torque received from the motor.

Generally, at the maximum vehicle speed, the ratio is maximum as there is the maximum number of rotations or fraction of rotation of the driven pulley for each full rotation of the drive pulley.

When the vehicle speed decreases, the rotational speed of the drive pulley eventually decreases as well since the rotational speed of the motor will decrease at one point. Ultimately, there is a decrease of the winding diameter at the drive pulley and a decrease of the radial force exerted by the drivebelt on the sheaves of the driven pulley. The driven pulley is then allowed to have a larger winding diameter as the spring and/or another biasing mechanism move(s) its movable sheave closer the fixed sheave.

Some CVTs are provided with an integrated clutch function. The clutch function can be on the drivebelt or be provided by a mechanism incorporated in the CVT. For instance, when the CVT has a clutch function on the drivebelt, the opposite walls of the fixed sheave and the movable sheave of the rotating drive pulley can be designed to be sufficiently apart that they are not in a driving engagement with the sides of the drivebelt. The drivebelt is then not moving and some models of drive pulleys have a bearing provided between the two sheaves. The outer race of such bearing supports the drivebelt when the drive pulley is in a disengaged position. Then, when the operating conditions are such that clutching is required, the actuation mechanism of the drive pulley moves the sheave walls closer relative to each other. The sheave walls eventually make contact with the sides of the drivebelt. At this point, an axial force is applied by the actuation mechanism on the drivebelt. The amount of torque transferred by the drivebelt is somewhat related to this axial force applied by the actuation mechanism. At one point, enough friction/force is generated between the sheave walls and the drivebelt to produce a significant force transfer between the driveshaft and the drivebelt, thereby causing torque from the motor to be transferred as a driving force on the drivebelt. This driving force is transferred to the driven pulley of the CVT.

Generally, torque applied on the drivebelt will result in vehicle acceleration at some point. The drivebelt will then accelerate in relation to vehicle speed. At start-up, the slippage between the drive pulley sheaves and the drivebelt is high, but decreases as the drivebelt accelerates, to the point where it becomes negligible and the drive pulley is considered fully engaged.

Electronically controlled CVTs are advantageous because they do not relate on the centrifugal force generated by the rotation of the sheaves like legacy CVT mechanical actuation mechanisms. In contrast, an electrically actuated CVT uses an electric motor and an adapted gearbox to set the CVT ratio. This provides the flexibility of using a specific CVT ratio in reaction of predetermined conditions regardless of the centrifugal force applied on the pulleys. Despite the advantages provided by an electronically controlled CVT, it is appreciated that the assembly of an electronically controlled CVT represents some challenges or benefits not encountered with legacy CVTs.

An electronically controlled CVT uses an assisting mechanism to manage the CVT ratio by changing the width of the drive pulley without solely relating on centrifugal forces. The assisting mechanism can be secured to the drive pulley preferably on the side opposed to the engine. The assisting mechanism can be operatively secured to the engine's drive axle without rotating therewith. At least a portion of the assisting mechanism moves along the engine's drive axle with the change in width between the drive pulley sheaves. This combined movement requires an adequate mechanical structure adapted to sustain fast repetitive movements under significant vibrations and mechanical loads.

Gears and axles are arranged in a complex operating layout in the electronically controlled CVT where small volume and low weight are key. Other considerations also need to be kept into account. For instance, the CVT should be easy to assemble, inexpensive to produce and minimize chances of errors during the assembly process. Additionally, the design of the electronically controlled CVT components should consider a variety of criterion like the mechanical resistance, the weight, the moment of inertia, the method of assembly and the manufacturing material in addition to the effect on the cost of the assembled final component.

The entire drive system, from the engine to the wheels in the case of a wheeled vehicle, needs to be sized and designed to sustain normal operating loads applied thereto. It is likely that such a drive system would experience a significant failure rate during typical use. In contrast, designing the entire drive system in consideration of the maximum operating load ensures the drive system be reliable under all possible loads despite maximum loads will be seldomly experienced under typical use. Such a more robust drive system uses bigger and heavier components to sustain possible high peak loads. This additional material in the drive system increases the size and the weight on the vehicle. The additional weight carried by the vehicle has the effect that more energy is required to accelerate and decelerate the vehicle. Some components of the drive system are rotating and are therefore requiring even more energy to accelerate, be maintained in rotation and to decelerate their rotating movement given their higher moment of inertia. Heavier rotating parts (or parts having a higher moment of inertia) are less energy efficient and increase the vehicle's energy consumption along the entire useful life of the vehicle.

Another drawback of legacy CVTs is that they relate on a centrifugal clutch to disengage from the drive mechanism. In other words, an electronically controlled CVT generally needs a separate clutch to completely disengage from its rotating power source. One particular problem with this type of drive system has been that, when the drive system is subjected to significant impact loads, such as those that occur, for example, when the vehicle jumps and the airborne wheel(s) accelerates on driver's demand before touching back the ground. These impact loads stem from the difference between the speed of the vehicle that is jumping and the circumferential tangential velocity of the airborne wheels of the vehicle. Much important torque peaks are sustained by the drive system when the vehicle lands after the jump and abruptly touches the ground to (almost) instantaneously bring back the circumferential tangential velocity of the wheels equal to the speed of the vehicle. The wheel acceleration just before a jump is sometimes at wide-open throttle and acceleration of the wheels is thus very fast when leaving the ground. These peak mechanical loads in the drive assembly are caused, in particular, because of the conjunction of high moment of inertia of the CVT and the drive assembly and high deceleration rate of the drive train.

Conventional drive assemblies, such as the one disclosed in U.S. Pat. No. 3,997,043, include an overload clutch disposed between the transmission and the wheels of the vehicle. The overload clutch disengages when a mechanical torque transmitted therethrough exceeds a predetermined value to try preventing damaging the drive train. On the other hand, the addition of a clutch undesirably increases the moment of inertia of the drive system.

Therefore, a need has been felt for an improved electronically controlled CVT over the prior art. It is therefore desirable to provide an electronically controlled CVT having a torque-limiting mechanism and method thereof adapted to prevent having to significantly oversize the drive train of a vehicle. Another need, inter alia, has been felt over the existing art for an electronically controlled CVT adapted to limit the torque transmitted to the drive train of a vehicle without adding more rotating mass to the drive train by matching the circumferential tangential velocity of an airborne wheel with the absolute vehicle speed.

SUMMARY

It is one aspect of the present invention to alleviate one or more of the drawbacks of the background art by addressing one or more of the existing needs in the art.

At least one embodiment of the present invention provides a system and a method thereof adapted to sense when wheels of a vehicle loose contact with the ground and the system and a method thereof manage the transmission ratio to prevent significant acceleration of the wheels by managing the circumferential wheels speed to mirror the speed of the vehicle to prevent having too much discrepancy between the circumferential tangential velocity of airborne wheel(s) with the speed of the vehicle that would cause significant torque peak in the drive train of the vehicle when the wheels re-contact the ground and change speed very rapidly.

At least one embodiment of the present invention provides an electronically controlled CVT adapted to limit the mechanical torque sustained by a drive train of a vehicle.

At least one embodiment of the present invention provides an electronically controlled CVT adapted to automatically adjust the circumferential tangential velocity of the driving wheels of a vehicle in respect with the speed of the vehicle in order to limit the peak mechanical torque sustained by the drive train of a vehicle.

At least one embodiment of the present invention provides an electronically controlled CVT adapted to substantially adjust the circumferential tangential velocity of airborne wheels with the speed of the vehicle in order to limit the mechanical torque peaks sustained by the drive train of a vehicle when the airborne wheel(s) recontacts the ground and equals the speed of the vehicle.

At least one embodiment of the present invention provides an electronically controlled CVT capable of determining when the circumferential tangential velocity of an airborne wheel of a vehicle is not substantially equal to the speed of the vehicle in order to limit the discrepancy between the circumferential tangential velocity of an airborne wheel and the speed of the vehicle to reduce the maximum mechanical torque sustained by a drive train of the vehicle when the airborne wheel re-contacts the ground.

At least one embodiment of the present invention provides an electronically controlled CVT adapted to prevent, or control, or minimize, circumferential tangential wheel speed discrepancy with the speed of a vehicle.

At least one embodiment of the present invention provides an electronically controlled CVT adapted to determine when a vehicle is airborne by monitoring the suspension travel of the vehicle.

At least one embodiment of the present invention provides an electronically controlled CVT configured to determine when a wheel of a vehicle does not touch the ground.

At least one embodiment of the present invention provides an electronically controlled CVT configured to determine when a wheel of a vehicle is airborne due, inter alia, to a roll of the vehicle.

At least one embodiment of the present invention provides an electronically controlled CVT adapted to determine when a vehicle is airborne by sensing the rotational position of a torsion bar interconnecting both sides of the vehicle.

At least one embodiment of the present invention provides an electronically controlled CVT adapted to determine when a vehicle is airborne by monitoring the acceleration of a CVT pulley and comparing the acceleration with a maximum acceleration reference value possibly achievable when the vehicle has all wheels on the ground and is under acceleration.

At least one embodiment of the present invention provides an electronically controlled CVT adapted to determine when a vehicle is airborne by monitoring the acceleration of the vehicle along at lest one of the X, Y and Z dimensions.

At least one embodiment of the present invention provides an electronically controlled CVT adapted to substantially keep a transmission ratio representative of the vehicle speed at the moment an airborne wheel of the vehicle has left the ground such that the circumferential tangential velocity of the airborne wheel is substantially maintained at the vehicle speed at the time the wheel left the ground.

At least one embodiment of the present invention provides an electronically controlled CVT adapted to substantially keep a constant transmission ratio representative of the transmission ratio at the moment an airborne wheel of the vehicle has left the ground such that the circumferential tangential velocity of the airborne wheel is substantially maintained at the vehicle speed at the time the wheel has left the ground.

At least one embodiment of the present invention provides an electronically controlled CVT adapted to influence the circumferential tangential velocity of an airborne wheels of a vehicle in respect with the speed of the vehicle by altering the distance between both sheaves of the drive pulley in order to limit the discrepancy between the circumferential tangential velocity of the airborne wheel and the speed of the vehicle to reduce the peak mechanical torque sustained by the drive train of a vehicle when the airborne wheel touches the ground.

At least one embodiment of the invention provides a memory adapted to receive and store data thereon representing the speed of the vehicle over time and a time value, used to go back in time in the stored data from the moment where an airborne wheel(s) is identified, to retrieve the recorded speed of the vehicle when the airborne wheel(s) has left the ground.

At least one embodiment of the invention provides an electronically controlled CVT for managing a transmission ratio between an engine and a rotatable ground-contacting member of a vehicle, the electronically controlled CVT comprising a drive portion comprising a drive pulley including two opposed sheaves; and an assisting mechanism for managing the transmission ratio by changing the distance between the two opposed sheaves for reducing a discrepancy between a vehicle speed and the peripheral speed of an airborne rotatable ground-contacting member; receiving a signal from a sensor disposed on the vehicle to determine if the rotatable ground contacting member is airborne; determining a desired circumferential speed of the rotatable ground-contacting member; and sending a signal indicative of the desired circumferential speed of the ground-contacting member to the electronically controlled CVT, wherein the sent signal is material for setting the transmission ratio for reducing the discrepancy between the vehicle speed and the circumferential speed of the airborne ground-contacting member.

At least one embodiment of the invention provides a vehicle including an electronically controlled CVT for managing a transmission ratio between an engine and a rotatable ground-contacting member of a vehicle, the electronically controlled CVT comprising a drive portion comprising a drive pulley including two opposed sheaves; and an assisting mechanism for managing the transmission ratio by changing the distance between the two opposed sheaves for reducing a discrepancy between a vehicle speed and the peripheral speed of an airborne rotatable ground-contacting member; receiving a signal from a sensor disposed on the vehicle to determine if the rotatable ground contacting member is airborne; determining a desired circumferential speed of the rotatable ground-contacting member; and sending a signal indicative of the desired circumferential speed of the ground-contacting member to the electronically controlled CVT, wherein the sent signal is material for setting the transmission ratio for reducing the discrepancy between the vehicle speed and the circumferential speed of the airborne ground-contacting member.

At least one embodiment of the invention provides a computer-readable medium comprising computer readable instructions stored thereon, the instructions, when executed, providing a method comprising sensing a vehicle speed; determining when a ground-contacting member supporting the vehicle is airborne; and managing an actuation mechanism setting a transmission ratio of an electronically assisted CVT on the vehicle to substantially match a circumferential velocity of the ground-contacting member with the vehicle speed.

Other embodiments, objects, aspects and further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

Additional and/or alternative advantages and salient features of the invention will become apparent from the following detailed description, which, taken in conjunction with the annexed drawings, disclose preferred embodiments of the invention.

DETAILED DESCRIPTION

Figure 1:
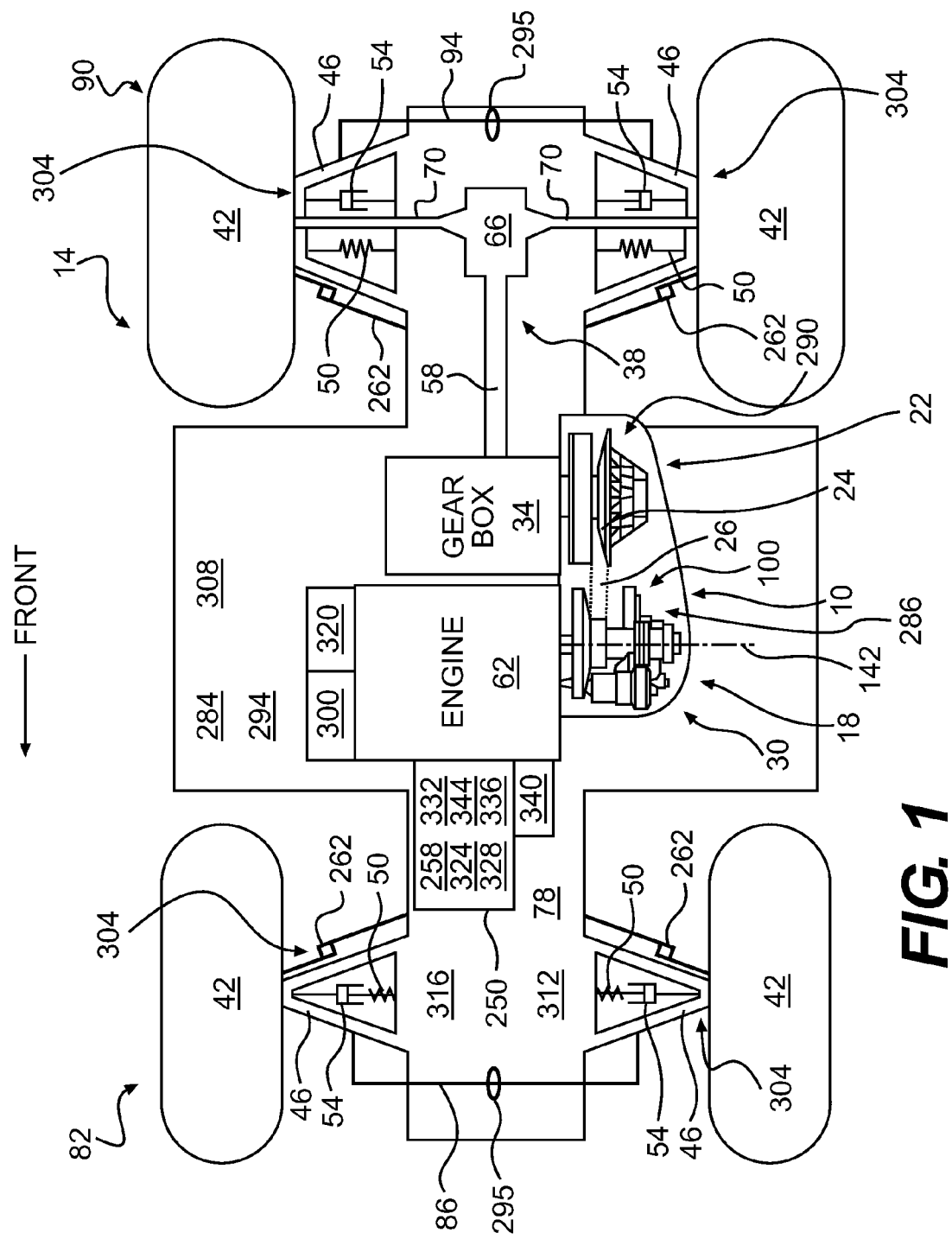
FIG. 1 shows a schematic illustration of a top plan view of a wheeled vehicle with an electronically controlled CVT thereon in accordance with an embodiment of the present invention.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

In respect with an embodiment of the invention, FIG. 1 illustrates an electronically controlled CVT 10 disposed in an exemplary vehicle 14. The CVT 10 includes a drive portion 18 and a driven portion 22 interconnected therebetween with a drivebelt 26. The drive portion 18 is provided with a CVT assisting mechanism 30 adapted to set the operating ratio of the CVT 10. In the present embodiment, the driven portion 22 is secured to an optional gearbox 34 to transmit rotational power to the drive mechanism 38 of the vehicle 14. The gearbox 34 is not required if the driven portion 22 of the CVT 10 already rotates at a desired output speed.

The vehicle 14 schematically illustrated on FIG. 1 is equipped with four wheels 42 like an off-road vehicle (e.g. all-terrain vehicle . . . ) or a road vehicle (e.g. car, golf cart . . . ). Although it is not hereby illustrated, the vehicle 14 could also be a snowmobile, a scooter, a motorcycle, an industrial vehicle or any other devices without departing from the scope of the present invention.

The illustrated vehicle 14 has suspension arms 46 with interconnected springs 50 and dampers 54. The drive mechanism 38 of the vehicle 14 includes a primary drive shaft 58 operatively connected between an engine 62 and a differential 66, and a pair of drive axles 70 operatively interconnected with the wheels 42. The illustrated vehicle 14 is equipped with a rear wheel drive system. It is understood that the present invention applied to a front wheel drive vehicle 14 or a four-wheel drive vehicle 14 would work in a similar fashion and is encompassed by the present explanations. Also, we use the term "wheel" throughout the present description although the present invention does not solely relate to wheeled vehicles but to all vehicle having ground-contacting members intended to support and propel the vehicle 14. Each wheel 42 supports a chassis 78 with interconnected suspension arms 46, springs 50 and dampers 54. The front pair of wheels 82 is interconnected with a front torsion bar 86 pivotably secured to the chassis 78 while the rear pair of wheels 90 is interconnected with a rear torsion bar 94 also pivotably secured to the chassis 78. The torsion bars 86 and 94 are torsioned or twisted when the vehicle 14 is subject to roll.

Figure 2:
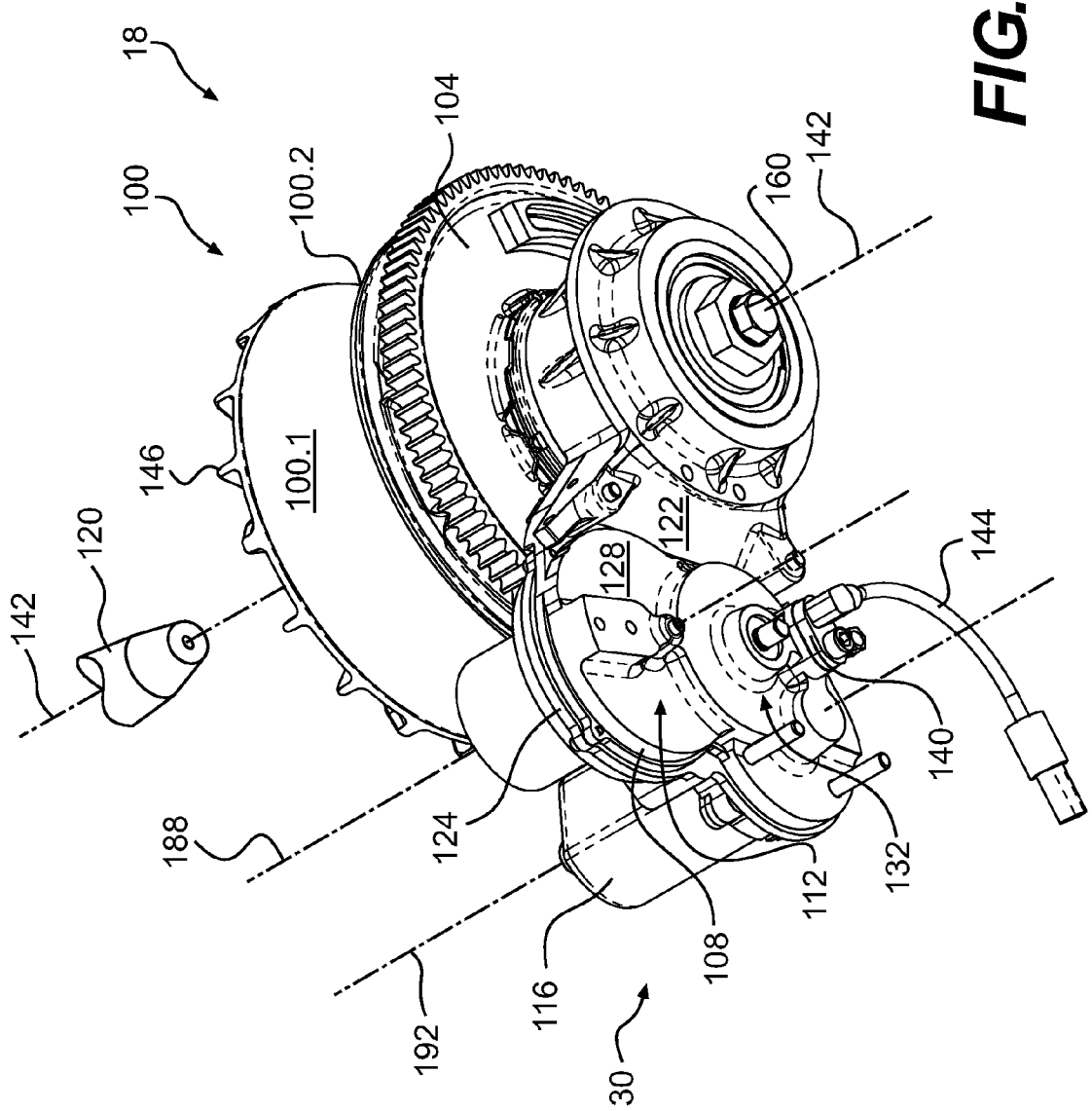
FIG. 2 is a magnified isometric view of a drive portion of the electronically controlled CVT in accordance with an embodiment of the present invention.
Figure 3:
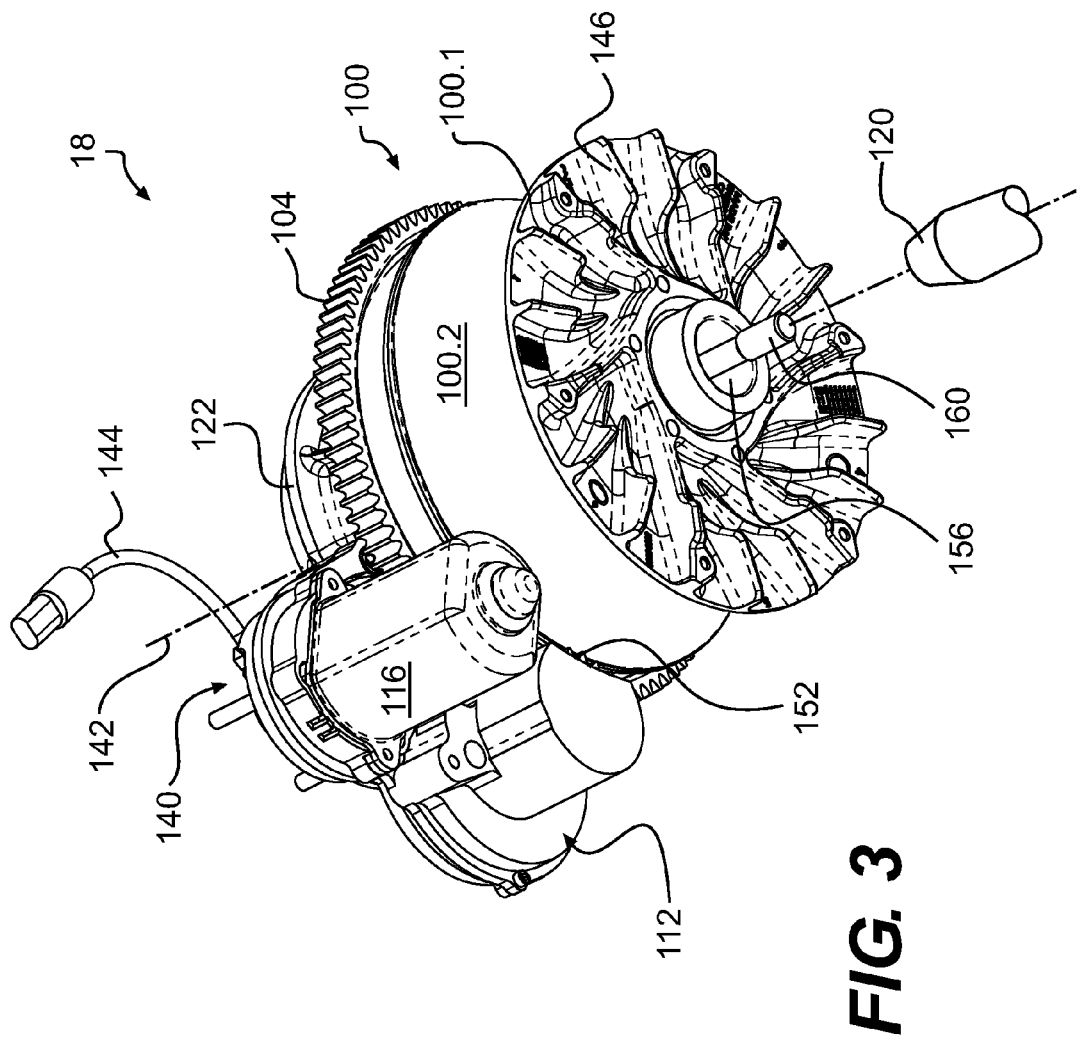
FIG. 3 is an alternate magnified isometric view of the drive portion of FIG. 2 in accordance with an embodiment of the present invention.

FIG. 2 and FIG. 3 illustrate in more details the drive portion 18 of the CVT 10. The drive portion 18 of the CVT 10 comprises drive pulley including a pair of opposed drive sheaves 100, a main actuation gear 104, a frame 108, a gearbox 112 and an electric actuation motor 116. In the present embodiment, the assisting mechanism 30 is a compact layout cooperating with the drive sheaves 100 and removably secured to a power drive 120 of the engine 62 (i.e. an internal combustion engine, an electric motor not shown in FIG. 2). The electric actuation motor 116 is secured to the frame 108 and adapted to rotate a plurality of operatively interconnected gears housed in the gearbox 112 to ultimately rotate the main actuation gear 104 at a desired speed.

The frame 108 of the assisting mechanism 30 of the present embodiment consists of two frame portions 124, 128 and a support portion 122 secured thereto. The frame 108 is adapted to receive and secure the electric actuation motor 116 thereon. The frame 108 is also configured to enclose a set of gears 132 therein acting as an actuation gearbox 112 to obtain the desired ratio between the electric actuation motor 116 and the main actuation gear 104. A sensor 140 is attached to the frame 108 to sense the position of the set of gears 132 to monitor their position. The sensor 140 is provided with a connecting wire 144 connectable to a wires harness (not shown) to communicate with a control module (not shown). The frame 108 is illustratively made of a light and strong material like aluminum in the presented embodiment.

The opposed drive sheaves 100 are concentrically secured to the power drive 120 of the engine 62 and adapted to rotate with the power drive 120 about a drive axis 142. The opposed sheaves 100 of the illustrated embodiment includes an axially fixed sheave 100.1 and an axially moveable sheave 100.2 as shown in FIG. 2 and FIG. 3. An alternate embodiment could have a design that moves the sheave 100.1 that is proximally disposed in respect with the engine 62 and keep the other sheave 100.2 longitudinally fixed. As best seen in FIG. 3, the fixed sheave 100.1 is equipped with a series of radial blades 146 adapted to act as an air pump to move air around the CVT 10.

The present embodiment illustrates that the main actuation gear 104 is secured on a female threaded body 148 (visible in FIG. 4 and FIG. 5) that, upon rotation, transforms the rotation of the main actuation gear 104 into a precise axial movement that impacts the axial distance between the sheaves 100. It is the axial position of the axially moveable sheave 100.2 (distal in respect with the engine 62) that changes while the fixed sheave 100.1 remains axially at the same position. Any rotation of the electric actuation motor 116 is therefore transformed into a change in distance between both sheaves 100.1, 100.2 of the drive pulley 100 to alter the transmission ratio of the CVT 10. As a skilled reader can understand, the axially moveable sheave 100.2 of another embodiment could remain longitudinally fixed while it is the other sheave 100.1, proximal to the engine 62, that longitudinally moves.

Figure 4:
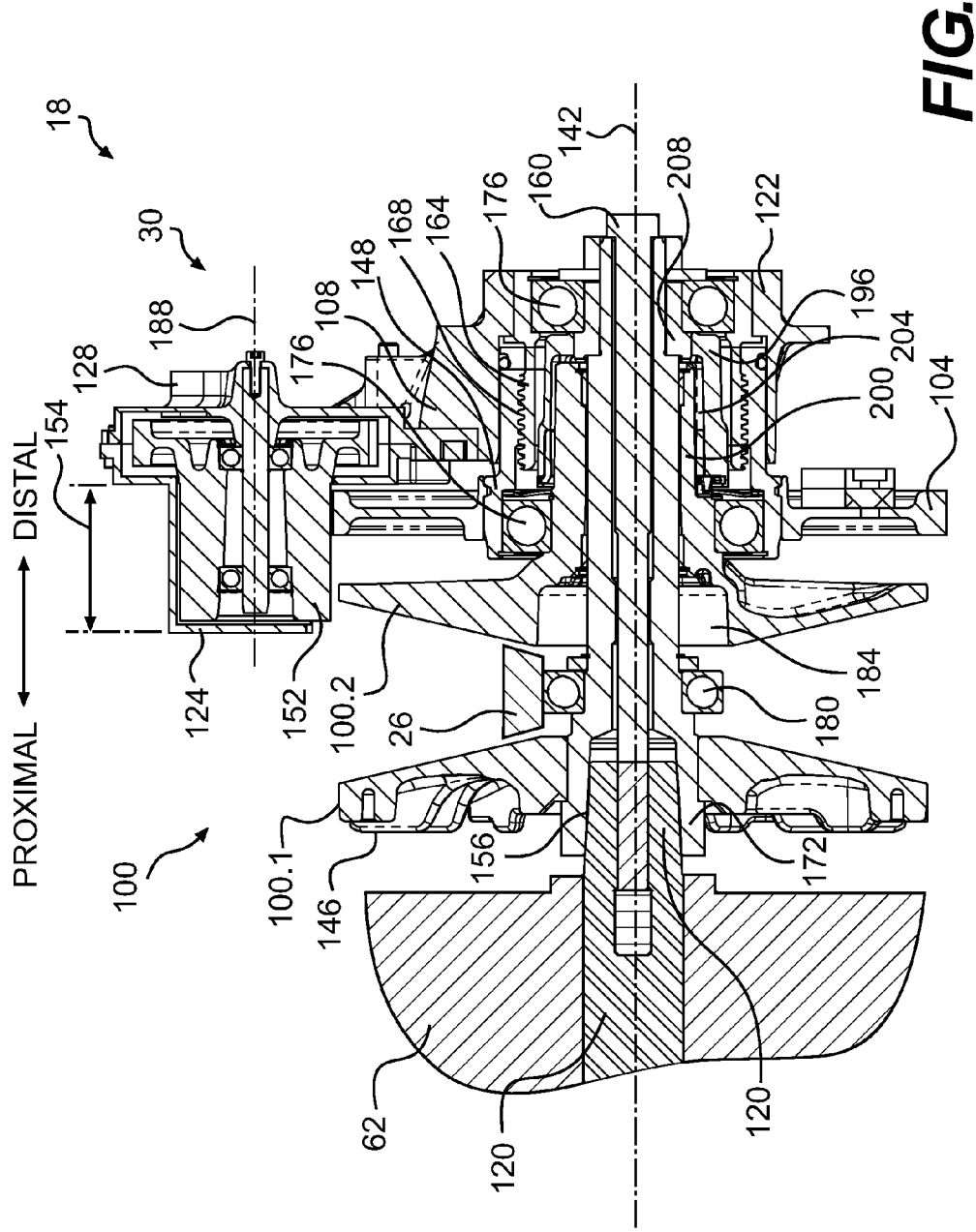
FIG. 4 is a section view of the drive portion illustrated on FIG. 2 and FIG. 3 where the sheaves are not in contact with the drivebelt and in accordance with an embodiment of the present invention.

The drive portion 18 of the embodied CVT is secured in cantilever on the power drive 30 as it can be seen in FIG. 4. It can be appreciated from FIG. 4 that the drive portion 18 is adapted to be secured to the power drive 120 with a cooperating self-centering female taper socket 156 and a long fastener 160 going through the drive portion 18, concentrically with the center of the pair of sheaves 100.

As it is better seen in FIG. 4, the electric actuation motor 116 is operatively connected to the gearbox 112 (not visible in FIG. 4 but is shown in FIG. 3 among other figures) that, itself, is operatively connected to the main actuation gear 104 via an elongated gear 152. The elongated gear 152 is provided with rather long teeth thereof to accommodate a complete teeth-engaging axial displacement 154 thereon of the main actuation gear 104 that longitudinally moves along with the axially moveable sheave 100.2.

FIG. 4 illustrates the configuration where the sheaves 100 are disposed at their maximum distance therebetween. The main actuation gear 104 is thus distally contacting the elongated gear 152. In contrast, FIG. 5 illustrates the same CVT 10 in a configuration where the sheaves 100 are disposed at their closest distance therebetween; it is possible to appreciate that the main actuation gear 104 contacts the elongated gear 152 on the proximal side.

One can see from FIG. 4 that the main actuation gear 104 is removably secured to a female threaded body 148 rotated thereby upon actuation of the electric actuation motor 116. The female threaded body 148 engages a counterpart male threaded body 164, which is secured to the frame 108, to create a threaded interface 168 therebetween. A rotational movement of the female threaded body 148 is therefore transformed into an axial movement due to the threaded interface 168. The female threaded body 148 experiences the entire axial displacement because the male threaded body 164 does not longitudinally move relatively to the frame 108 and the axial shaft 172. This axial displacement of the female threaded body 148 is communicated by the main actuation gear 104, which is rotated by the elongated gear 152. In other words, the electric actuation motor 116, fixedly connected to the frame 108, can apply a controlled rotational displacement of the main actuation gear 104 to axially move the axially moveable sheave 100.2 via the threaded interface 168.

Still referring to FIG. 4, the assisting mechanism 30 is supported by the distal end of the rotating axial shaft 172. A pair of intervening support bearings 176 allows rotational movements between the assisting mechanism 30 and the axial shaft 172. The pair of support bearings 176 also allows the assisting mechanism 30 to be angularly secured about the axial shaft 172 when the electronically controlled CVT 10 is positioned and secured in its final operative layout.

Figure 5:
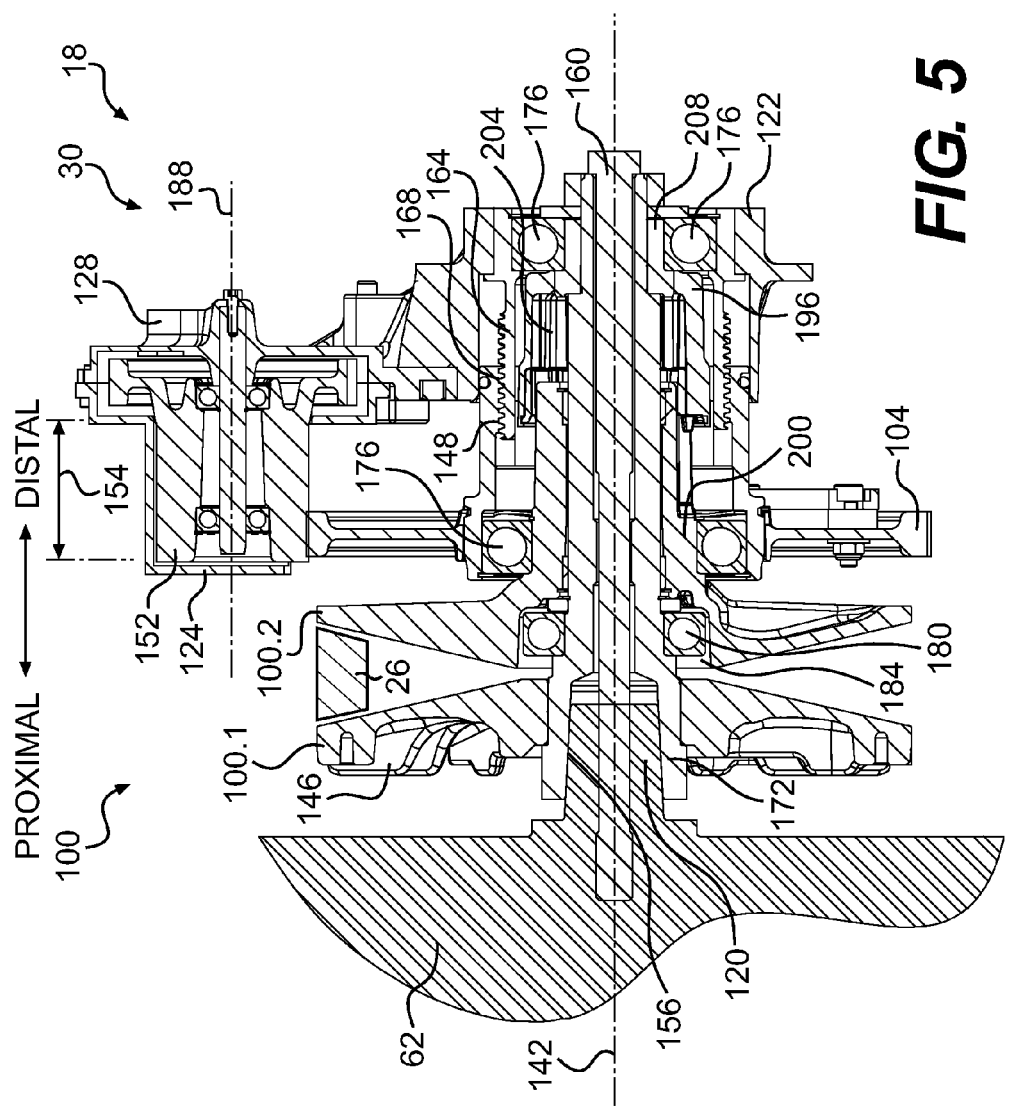
FIG. 5 is a section view of the drive portion illustrated on FIG. 2 and FIG. 3 where the sheaves are in contact with the drivebelt and in accordance with an embodiment of the present invention.

The elongated gear 152, well illustrated in FIG. 4 and in FIG. 5, is elongated because it is operatively engaging the axially moveable main actuation gear 104. The elongated gear 152 is longitudinally fixedly positioned in respect with the distal end of the axial shaft 172 and has an effective length 154 that corresponds with the axial displacement of the main actuation gear 104 that is at least as long as the maximum operating axial distance variation between both sheave 100.

In reference with FIG. 2 through FIG. 5, the axis 188 of the elongated gear 152 is parallel with the drive axis 142. The elongated gear 152 extends outside the periphery of the axially moveable sheave 100.2 and is driven by the main actuation gear 104 that has a diameter that is larger than the diameter of the axially moveable sheave 100.2. The rotation axis 192 of the electric actuation motor 116 is parallel with the drive axis 142. Similarly, the electric actuation motor 116 extends outside the periphery of the axially moveable sheave 100.2.

Still referring to FIG. 4 and FIG. 5 where is illustrated a neutral bearing 180 disposed on the axial shaft 172 between the sheaves 100. A cavity 184 is formed in the axially moveable sheave 100.2 to receive the neutral bearing 180 therein when both sheaves 100 are closer to engage and rotate the drive belt 26 on a larger operating diameter. The neutral bearing 180 supports the drive belt 26 and prevents it to friction the rotating axial shaft 172 when both sheaves 100 are distanced enough from each other by the assisting mechanism 30 to disengage the sides of the drive belt 26 from the sheaves 100. The CVT is in the "neutral" position (meaning the belt 26 is not driven by the drive pulley 100) when the drive belt 26 is laterally uncompressed between the sheaves 100. The sheaves 100 continue to rotate with the power drive 120 when the CVT is in the "neutral" position. The axially moveable sheave 100.2 is coupled to the axially fixed sheave 100.1 by the axial shaft 172 and rotates when the CVT is in the "neutral" position. Reducing the distance between both sheaves 100 with the assisting mechanism 30 reengages the drive belt 26. The friction between the drive belt 26 and both sheaves 100 progressively engages the drive belt 26 until the drive belt 26 is propelled by the rotating sheaves 100. Put differently, the electronically controlled CVT 10 in accordance with the present embodiment is equipped with a disengagement mechanism. The disengagement mechanism is not a centrifugal clutch as commonly used in legacy CVTs. Disengagement is produced by managing the distance between the sheaves 100 of the drive pulley with the assisting mechanism 30 to a point where the drivebelt 26 does not operatively contact the sheaves 100 nor the axial shaft 172 and freely rests on the neutral bearing 180. Reengagement of the drivebelt 26 is managed by the assisting mechanism 30 by reducing the distance between the sheaves 100 to contact and move the drive belt 26 to rotate the driven portion 22.

Figure 6:
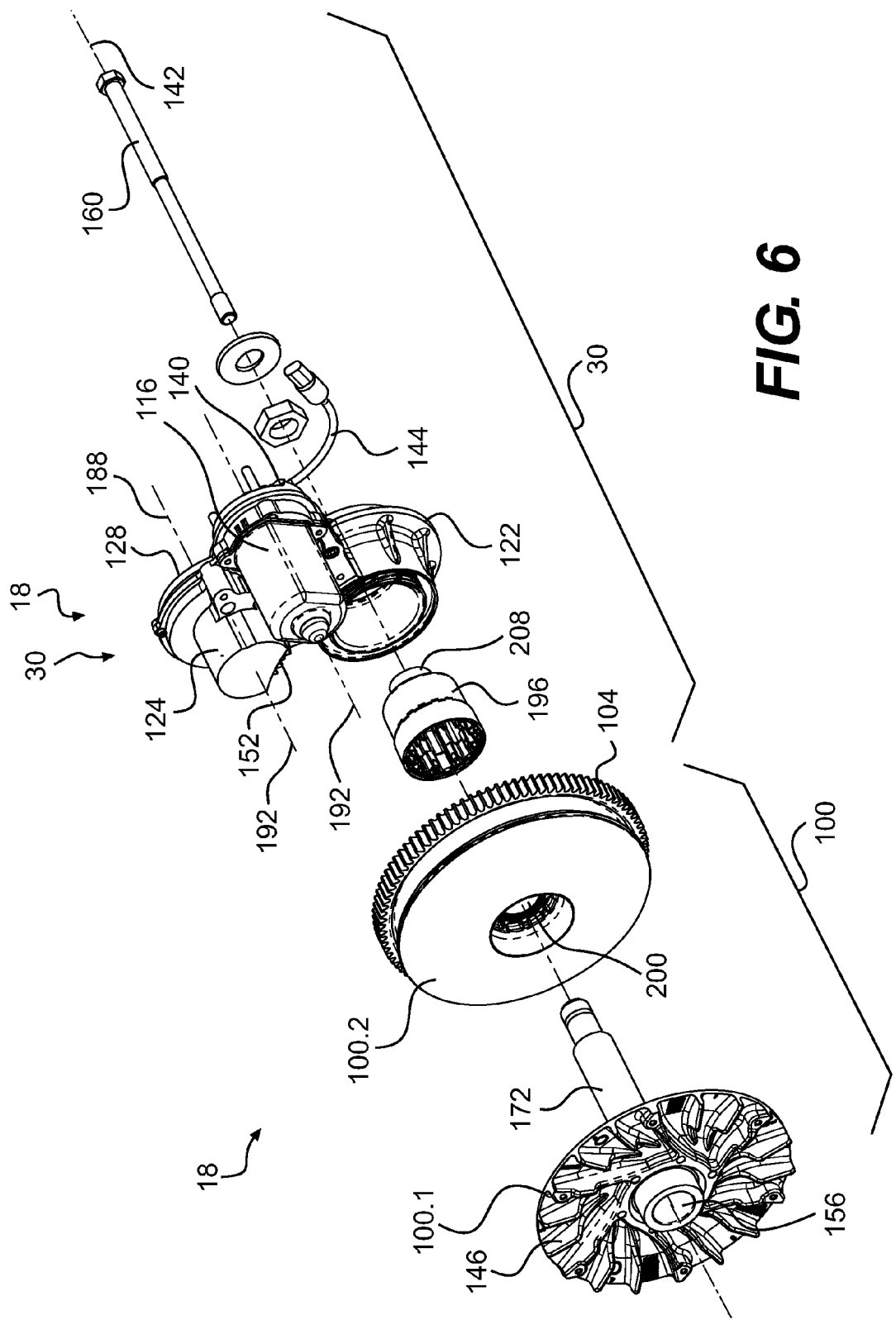
FIG. 6 is a semi-exploded dimetric view of the drive portion of the electronically controlled CVT of FIGS. 2, 3, 4 and 5 in accordance with an embodiment of the present invention.
Figure 7:
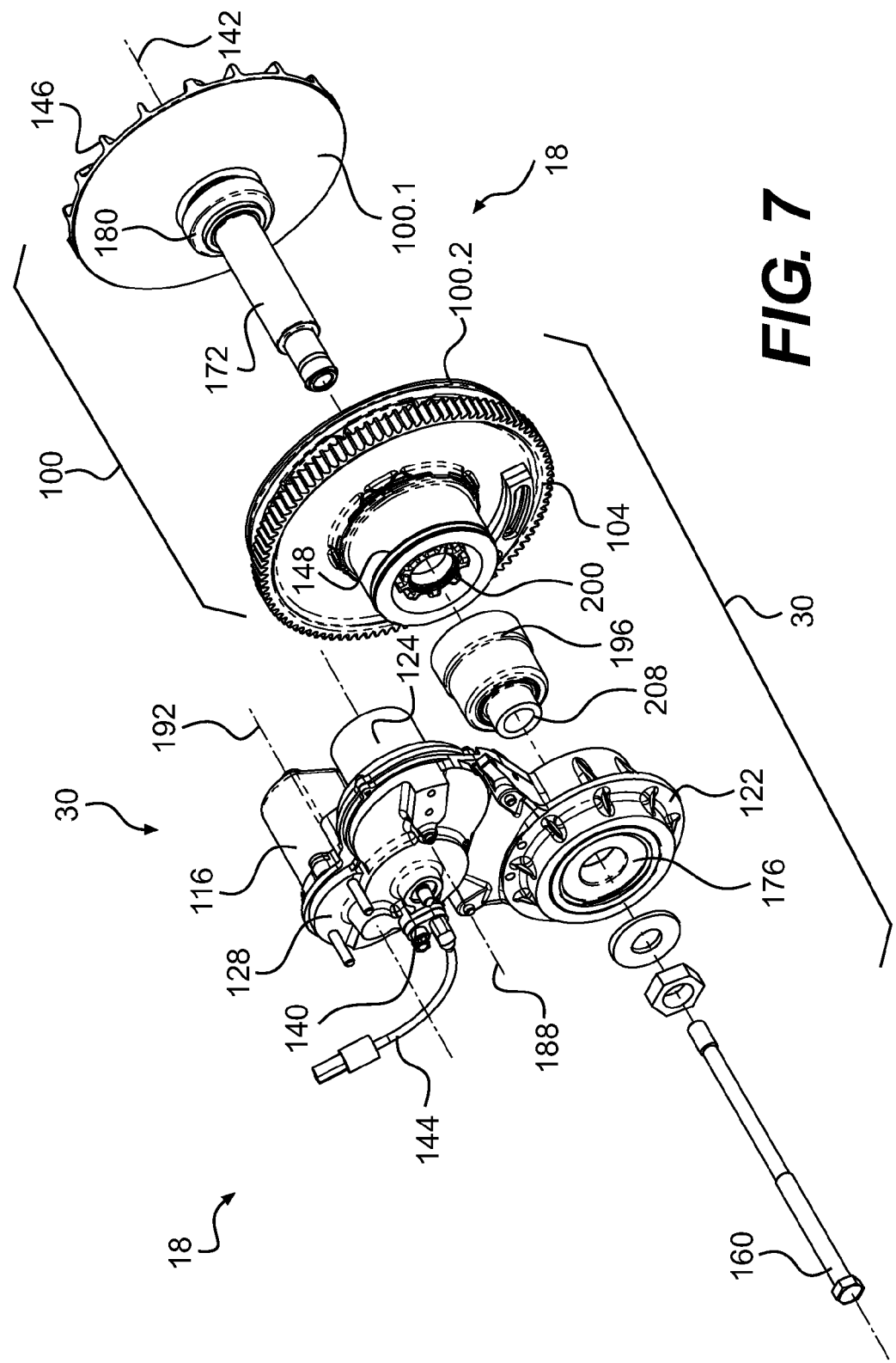
FIG. 7 is an alternate semi-exploded dimetric view of the drive portion of the electronically controlled CVT of FIGS. 2, 3, 4 and 5 in accordance with an embodiment of the present invention.

FIG. 6 and FIG. 7 depict a semi-exploded drive portion 18. The axially fixed sheave 100.1 (left) is adapted to receive the axially moveable sheave 100.2 (right) on the axial shaft 172. The hollowed axial shaft 172 is sized and designed to receive the long fastener 160 therein to secure the assembly to the power drive 120 of the engine 62.

Figure 8:
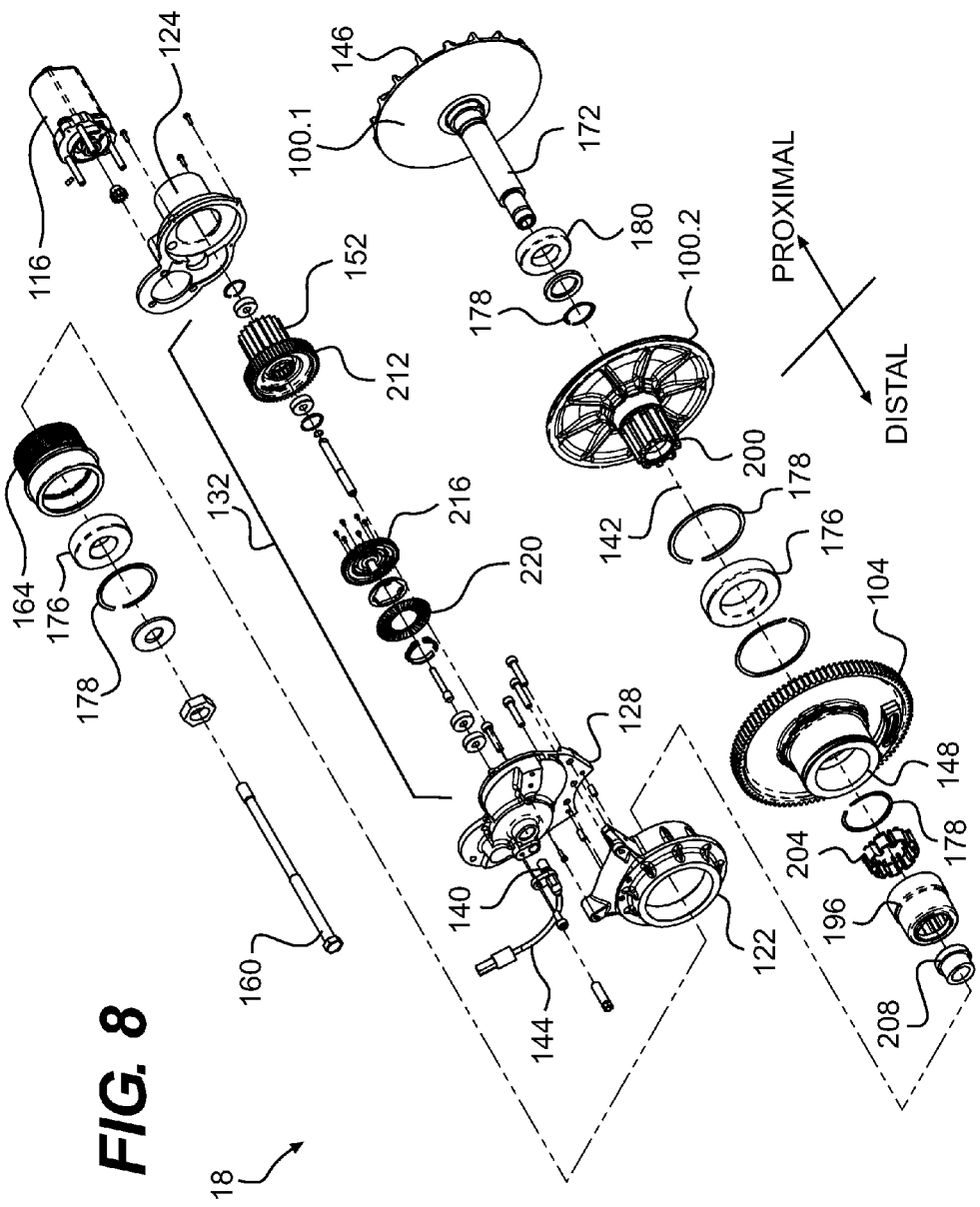
FIG. 8 is an exploded dimetric view of the drive portion of the electronically controlled CVT of FIGS. 2, 3, 4 and 5 in accordance with an embodiment of the present invention.

Turning now to FIG. 8 illustrating in more details an embodiment of the present invention. The exploded view of the drive portion 18 of the CVT 10 depicted in FIG. 8 teaches in further details how the drive portion 18 is assembled. Beginning with the fixed sheave 100.1, from which extends the axial shaft 172 to which is assembled thereon the axially moveable sheave 100.2. The main actuation gear 104 is fixedly secured to the female threaded body 148 that is adapted to cooperate with corresponding male threaded body 164. The male threaded body 164 is secured to the support portion 122 and acts as an abutment when the female threaded body 148 is screwed thereon moving axially following the threads of the threaded interface 168 created thereby. The longitudinal displacement of the female threaded body 148 moves both the main actuation gear 104 and the axially moveable sheave 100.2. Bearings 176 intervene between the female threaded body 148 and the axially moveable sheave 100.2 to prevent the main actuation gear 104 to rotate with the sheaves 100 and the axial shaft 172. The male threaded body 164 and the female threaded body 148 could be inverted, if properly designed, such that the male threaded body 164 receives the main actuation gear 104 thereon.

An intervening slider member receptacle 196 is provided to support the distal end of the axial shaft 172 and to support thereon the support portion 122 of the assisting mechanism 30. The slider member receptacle 196 also slideably receives therein the shaped protruding end 200 of the axially moveable sheave 100.2 and supports thereon its associated main actuation gear 104. The cylindrical external shape of the slider member receptacle 196 is sized and designed to fit in corresponding opening in the support portion 122 and to accommodate a slider member 204 therein. The slider member 204 intervening between the internally located distal protruding end 200 of the axially moveable sheave 100.2 and the internal shape of the slider member receptacle 196. The slider member 204 has a shape adapted to transmit rotational movement while allowing a smooth axial movement between the distal end of the axially moveable sheave 100.2 and the slider member receptacle 196. The slider member 204 also acts as a vibration damper between the two components thus preventing or reducing possible rattles. Additionally, a bearing-receiving unit 208 is concentrically mounted at the distal end of the slider member receptacle 196 to support the distal end of the rotating assembly by rotatably engaging a bearing 176 secured in the fixed male threaded body 164.

Still in FIG. 8, the elongated gear 152 is associated with an adjacent larger gear 212 and other gears 132 to further change the gear ratio. Complementary gears 216 and 220 are arranged to provide a proper teeth-moving frequency for the sensor 140 to sense. The sensor 140 senses when each teeth of the gear 220 passes nearby and changes state and/or sends a signal thereof to a control system (not shown) monitoring and managing the assisting mechanism 30.

Figure 9:
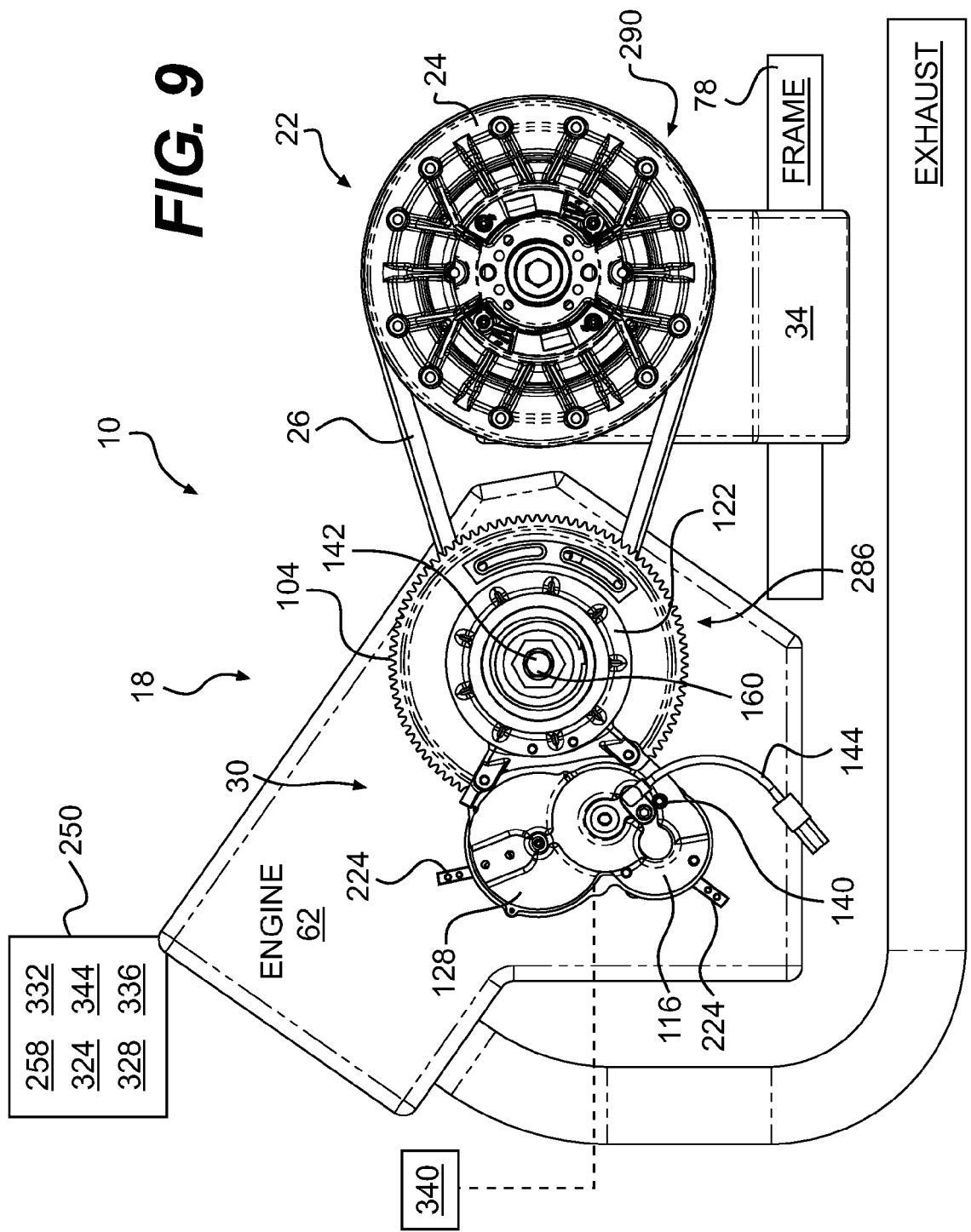
FIG. 9 is a side elevational view of an illustrative assembly of an assisting mechanism of the drive portion of the electronically controlled CVT of FIGS. 2, 3, 4 and 5 in accordance with an embodiment of the present invention.

Referring now to FIG. 9 where one can appreciate that the assisting mechanism 30 is secured to the engine 62 with a retaining member 224 to prevent the assisting mechanism 30 to rotate about the drive pulley axis 142. A single retaining member 224 can be enough to withstand the limited torque applied on the assisting mechanism 30 that is mostly only caused by friction in bearings 176.

The torque limiting system of the present invention manages the circumferential wheel velocity to mirror the actual speed of the vehicle 14 when wheels 42 are airborne. The circumferential wheel velocity can either exceed the speed of the vehicle 14, in the case of an acceleration that does not propel the vehicle 14 by transmitting motive power to the ground, or be less than the speed of the vehicle 14 in the case of a deceleration.

The control module 250 of the assisting mechanism 30 mainly uses at least two different strategies for changing the circumferential wheel velocity. A first strategy consists in adjusting the CVT transmission ratio to match the circumferential wheel velocity. A second strategy consists in blocking the CVT ratio to prevent acceleration/deceleration of airborne wheels.

In accordance with one embodiment of the invention, an active strategy can be used to prevent significant discrepancy between the speed of the vehicle 14 and the circumferential wheel velocity. The active strategy uses different sensors located on the vehicle 14 for analyzing in real time the vehicle's 14 behaviors and to manage the electronically controlled CVT 10 to match the circumferential wheel velocity with the speed of the vehicle 14. In contrast, a passive strategy uses limited inputs gathered from the vehicle 14 in relation with prerecorded vehicle behavior mappings to find the desired CVT ratio in the instant circumstances.

At first, the assessment of an airborne wheel 42 must be made. Generally, the management module 250, in conjunction with one or many sensors, will decide whether or not a wheel 42 is airborne. The electronically assisted CVT 10 will be used to manage the circumferential wheel velocity of the airborne wheel 42. But before the management module 250 should determine if the lifted wheel 42 is caused by turning or by a jump. One way to detect the vehicle 14 turns is to detect a roll on the vehicle 14. The management of the electronically assisted CVT 10 likely differs when the vehicle 14 jumps and when the vehicle 14 turns and rolls. The acceleration is generally quite limited when negotiating a curve as opposed to taking a jump and it is generally not desirable to intervene. This is one reason why the assisting mechanism 30 generally does not intervene when a roll is detected. Another reason is that some two-wheel drive vehicles 14 have a solid rear axle 70 that equally rotates both rear wheels 42. Exemplary strategies will be explained in details below.

Figure 10:
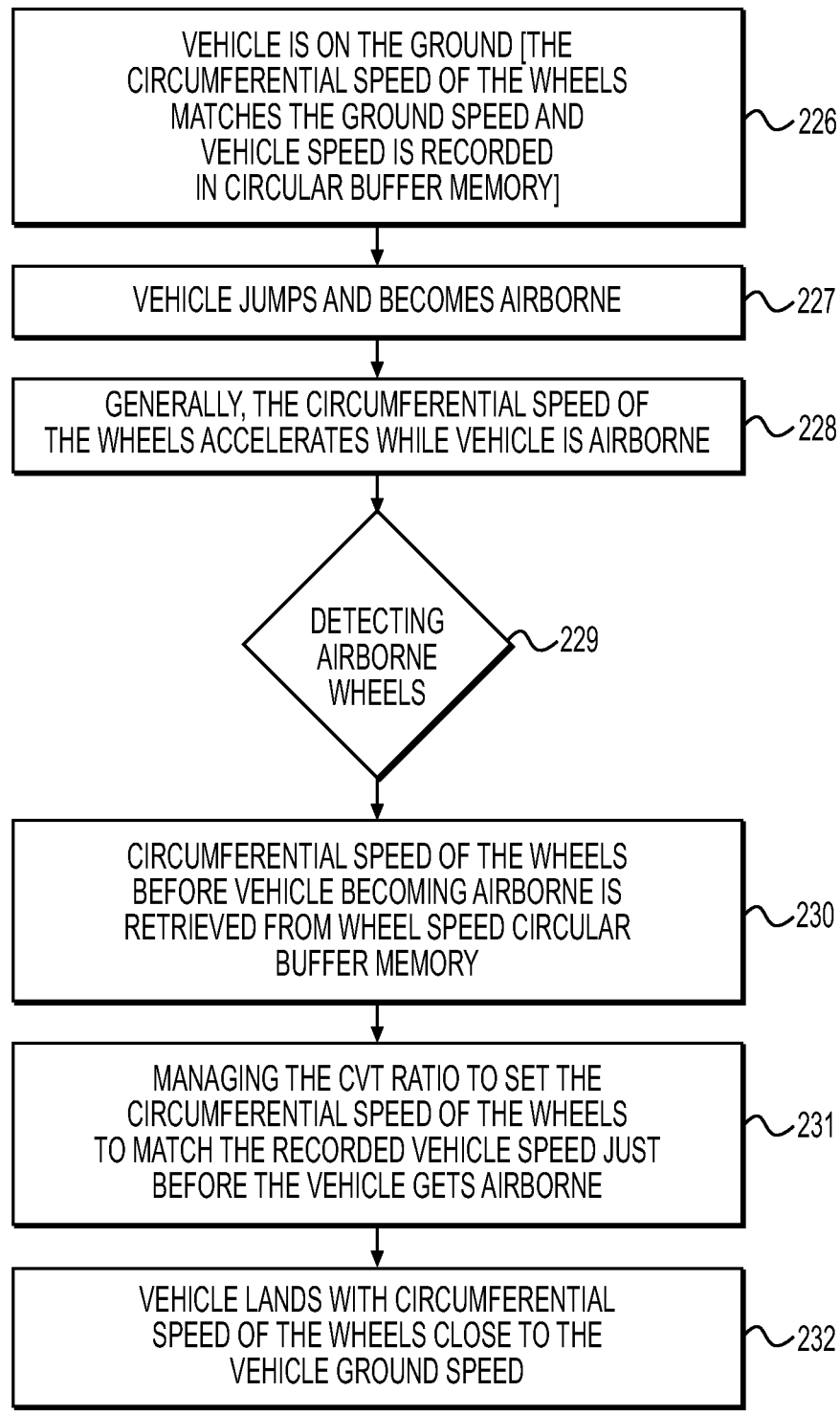
FIG. 10 is a flow chart of an illustrative method of managing a circumferential wheel speed in accordance with an embodiment of the present invention.

Turning now to FIG. 10 illustrating a flow chart with a basic series of steps for actively managing airborne wheels of a vehicle 14 in accordance with an embodiment. Firstly, the vehicle moves on the ground 226, the speed of the wheels 42 is equal to the speed of the vehicle 14 in respect with the ground and is recorded in the memory module 258 (illustrated in the system of FIG. 12); the vehicle jumps on a jump and becomes airborne 227; the speed of the speed of the wheels accelerates given the vehicle is airborne and is still under power with no road load anymore 228; the management system of the assisting mechanism detects if the there are airborne wheels 229; the circumferential speed of the wheels before becoming airborne is retrieved from the wheel speed circular memory buffer 230 if it is found that the wheels are airborne; then the CVT transmission ratio is set to match the circumferential speed of the wheels with the actual speed of the vehicle 231 and finally the vehicle re-contacts the ground with the circumferential speed of the wheels substantially equal to the vehicle ground speed 232. No discrepancy between the two speeds means there is no mechanical peak of torque induced in the drive mechanism 38.

The memory module 258 might record data with a loop memory and overwrite the oldest recorded data thereon to ensure continuous data recording with a memory of a limited size. The vehicle speed at the time an airborne wheel is detected becomes the reference vehicle speed because the vehicle 14 ground speed does not substantially change when airborne.

It is desirable to get back in time to get the speed of the vehicle 14 when the airborne wheel 42 is detected. The speed of the vehicle 14 at this precise moment becomes the vehicle speed reference for the management module 250 and data processing. Using recorded data is desirable give time to the system to evaluate if the circumstances require an intervention. For instance, it is generally not desirable to intervene when the vehicle 14 manages small jumps. The time delay is also helpful to prevent using less accurate data that might have suffered of the time required to collect signals from sensors, transmit the data, process the data to find the desired CVT ratio and apply the ratio to the electronically controlled CVT 10. The reference vehicle speed might be the vehicle speed a moment before a significant suspension extension is detected 236 as illustratively embodied in FIG. 11.

Figure 11:
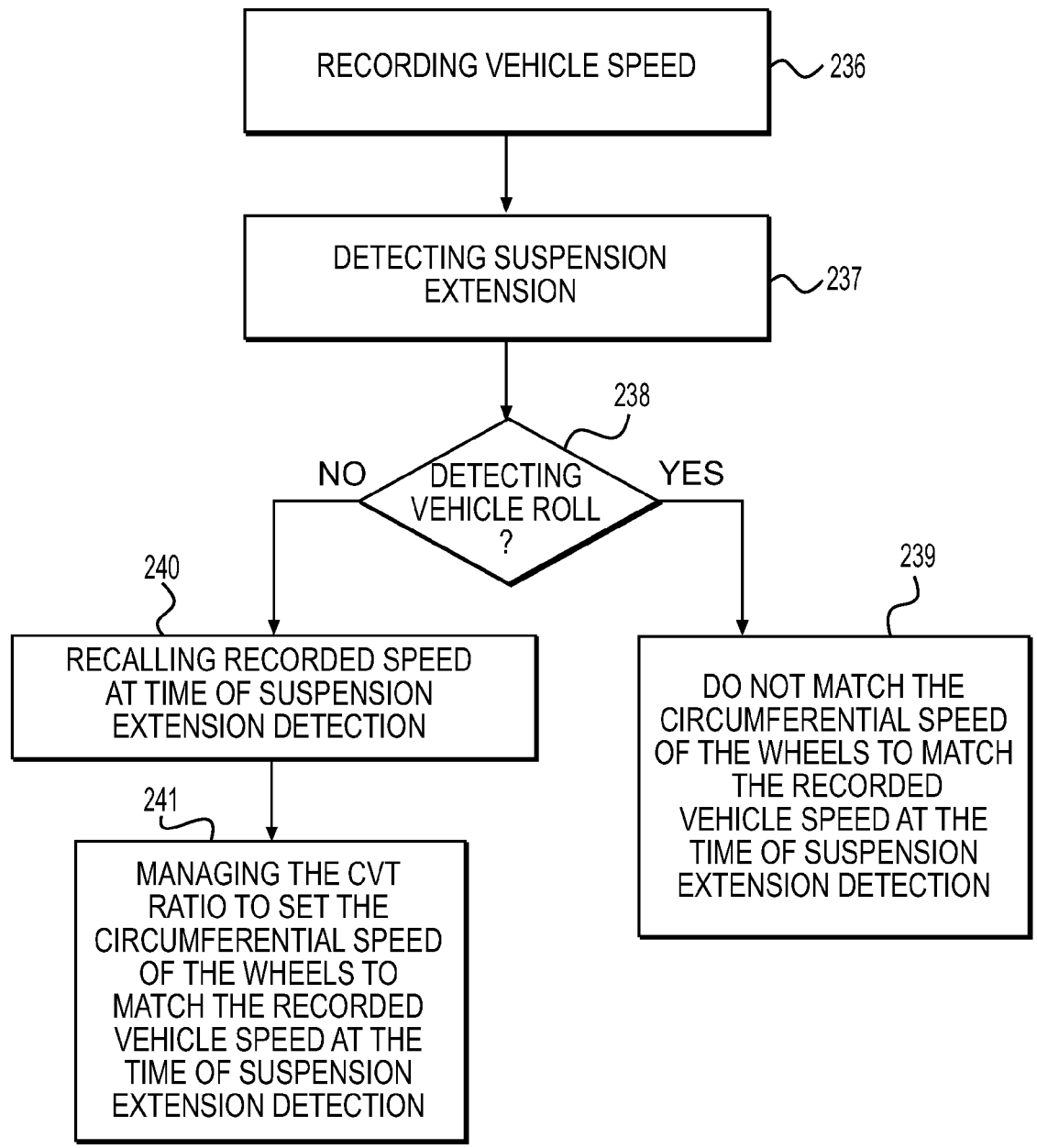
FIG. 11 is a flow chart of an illustrative method of managing a circumferential wheel speed in accordance with an embodiment of the present invention.

Another illustrative flow chart is found in FIG. 11 where a recordation of the vehicle's speed is made 236. The speed of the vehicle is continuously recorded in the memory module 258 and referred to when at least one wheel 42 of the vehicle 14 gets airborne. An airborne wheel can be found by sensing, inter alia, an extension of the vehicle's suspension 237, a zero-acceleration of the vehicle 14 over a period of time and by comparing instant behaviors of the vehicle 14 with pre-defined vehicle-behavior mappings.

Still referring to FIG. 11, the torque limiting system also verifies if a roll of the vehicle 14 is sensed 238 to prevent altering the rotating speed of the wheels 42 when the wheel 42 is airborne due to a vehicle 14 roll. No electronically controlled CVT ratio correction 239 will be made in the case a vehicle roll 238 is sensed because the vehicle 14 is not considered airborne. However, the system recalls the recorded speed of the vehicle 240 and manages 241 the electronically controlled CVT 10 when vehicle roll 238 is not detected to substantially match the circumferential airborne wheel velocity with the reference vehicle speed to reduce the speed difference between the circumferential airborne wheel velocity and the actual ground referenced vehicle speed. In the present example the reference vehicle speed is recalled 240 from the vehicle speed recorded at step 236 if there is suspension extension 237 exceeding a predetermined threshold and if no vehicle roll 238 is detected.

Figure 12:
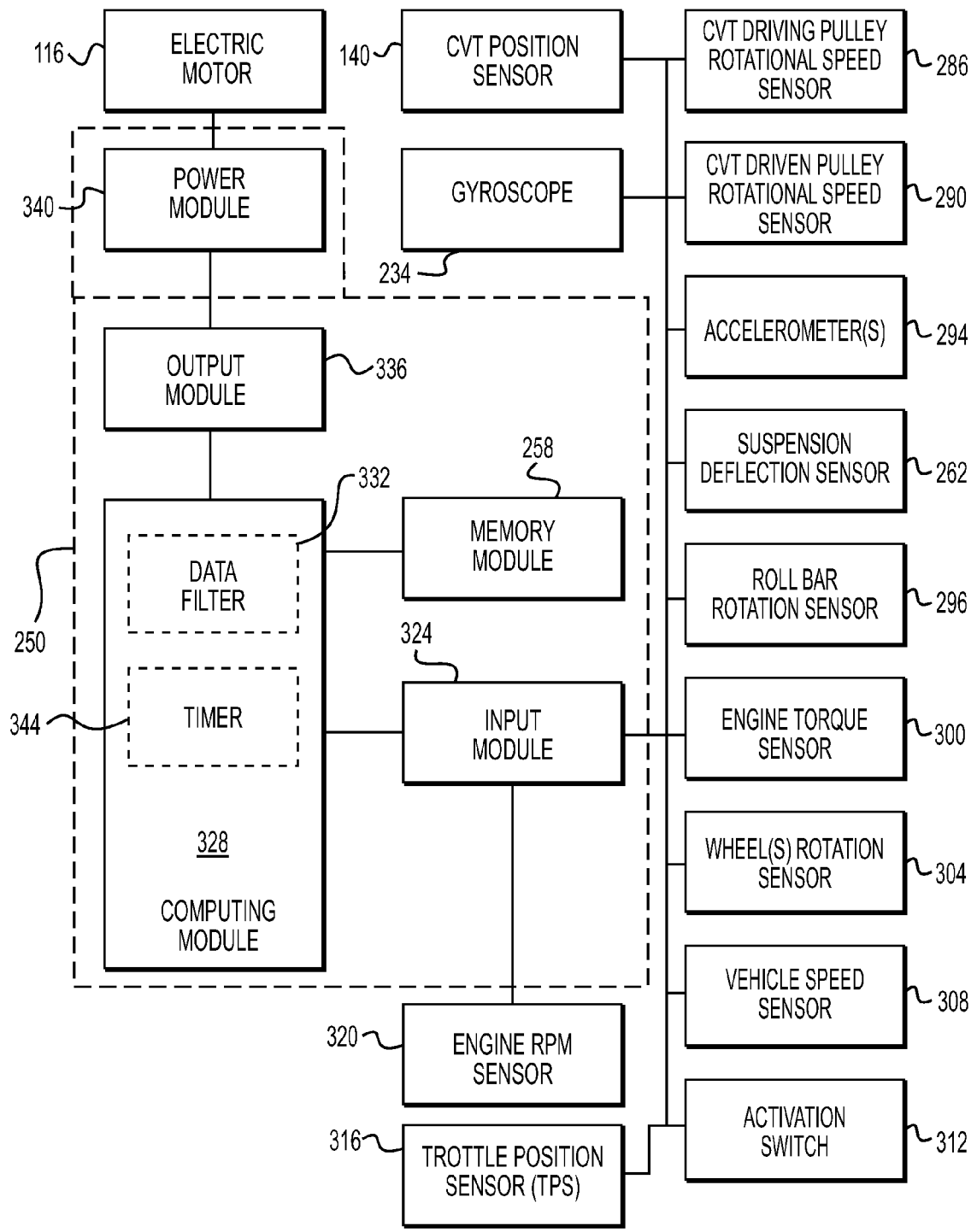
FIG. 12 is a block diagram of an illustrative system material in the control of the CVT in accordance with an embodiment of the present invention.

As previously indicated in respect with an embodiment of the invention, the active strategy requires a plurality of sensing elements illustrated in FIG. 12. The electronically controlled CVT 10 is provided with an electric motor 116 adapted to set the distance between both sheaves 100 and define the desired transmission ratio of the CVT 10. The electric motor 116 is operatively connected to a CVT management module 250 configured to send a signal to power the electric motor 116—or directly power the electric motor 116 if there is a power system therein—to change the transmission ratio of the CVT 10. The CVT management module 250 is connected to a plurality of sensors 140, 262, 284, 290, 294, 296, 300, 304, 308, 312, 316 and 320 to receive signals therefrom that might be used to detect when the vehicle 14 is airborne and to establish the appropriate CVT ratio modification, if required.

The CVT drive pulley 100 rotational speed sensor 286 is disposed on the CVT drive portion 18 to provide a signal representative of the rotating speed of the drive pulley 100. The CVT drive pulley 100 rotational speed sensor 286 could alternatively be the rotational output speed of the engine's drive 120 provided by a built-in engine RPM sensor 320. Similarly, a CVT driven pulley rotational speed sensor 290 is disposed on the CVT driven portion 22 to provide a signal representative of the rotating speed of the driven pulley 24. A throttle position sensor 316 (TPS) is also provided to provide a signal representing how much throttle is applied at a given time. A multiple axes accelerometer 294 (X, Y, Z) is optionally disposed on the vehicle 14 to provide a signal representative of a longitudinal acceleration, transversal acceleration, vertical acceleration, roll, pitch and yaw of the vehicle 14. Accelerometers having less sensing capabilities might be used alone or collectively without departing from the scope of the present application. A suspension deflection sensor 262 is monitoring the position of at least one suspension component. The suspension deflection sensor 262 is preferably associated with each suspension arm 46 as best illustrated in FIG. 1 to provide data about the respective position of each suspension arm 46. The suspension displacement (extension and/or compression) is representative of the weight applied on the suspension of the vehicle 14 to determine when the vehicle 14 is airborne if the suspension position does not mirror the weight of the vehicle 14. Suspensions targeted by the present invention are not limited to suspension mechanism equipped with suspension arms 46 and covers other types of moveable suspension members.

The indication of suspension extension exceeding a predetermined extension threshold indicates to the CVT management module 250 that the wheels 42 (or the ground contacting members in the case of vehicles that do not use wheels, like a snowmobile for instance) of the vehicle 14 are lightly in contact, or not in contact with the ground at all, with the ground. In other words, the wheels 42 of the vehicle 14 are free to accelerate when subjected to the engine's 62 power without propelling the vehicle 14. One skilled in the art, or a driver who experienced aggressive driving of a vehicle 14, will appreciate that the wheels 62, once they have left the ground and are airborne, will rotationally accelerate very quickly and reach a circumferential wheel velocity that is significantly above the actual speed of the vehicle 14. The circumferential wheel velocity will abruptly get back to the speed of the vehicle 14 when the wheel 42 re-contacts the ground, thus inducing huge undesirable mechanical stress in the drive mechanism 38 of the vehicle 14. These undesirable peaks of torque are, inter alia, why drive trains 38 must be over designed. Smaller drive members 38 with smaller moment of inertia would be used should these peaks of torque be reduced or prevented.

Figure 13:
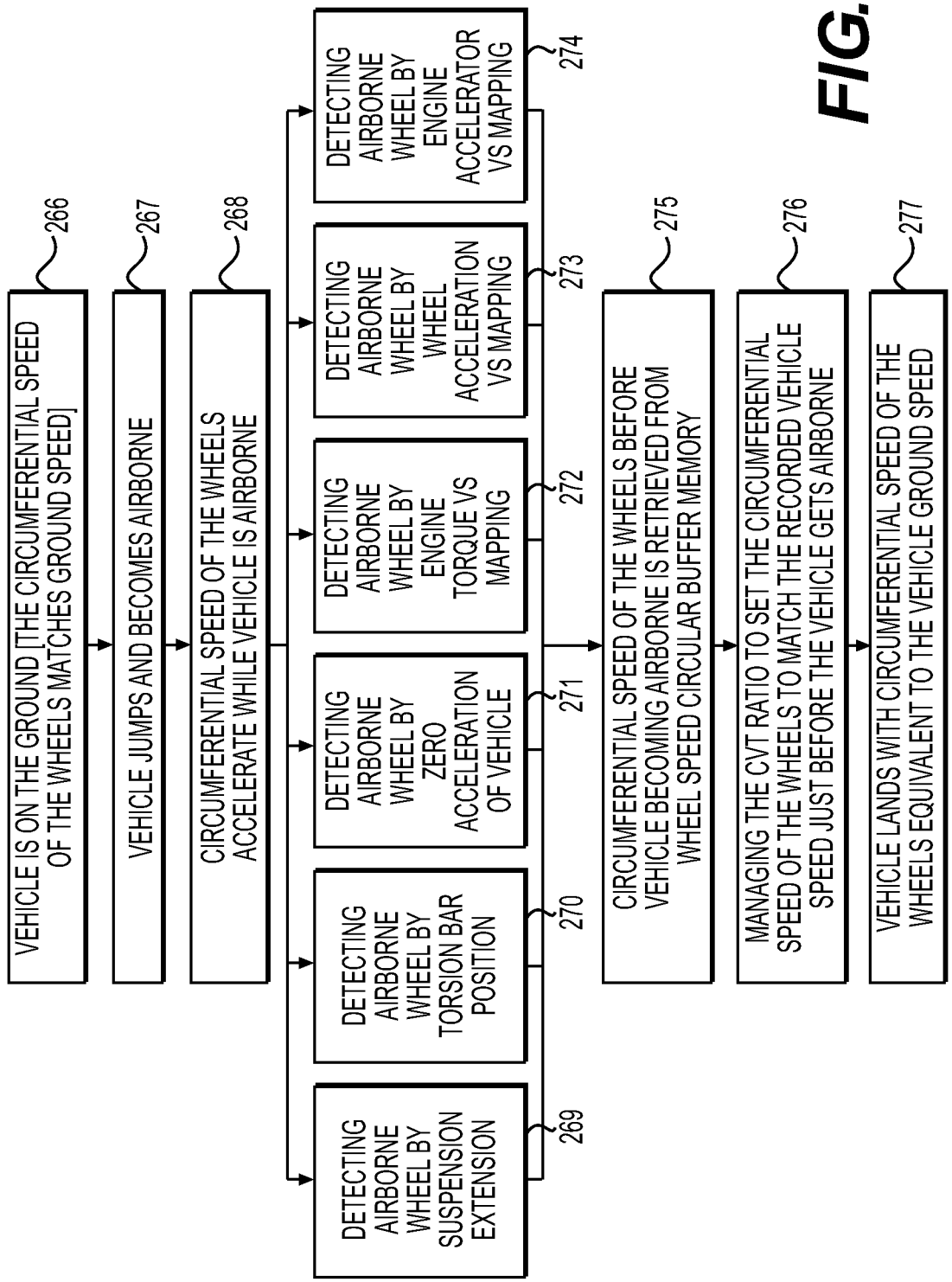
FIG. 13 is a flow chart of an illustrative method of managing a circumferential wheel speed in accordance with an embodiment of the present invention.

Turning now to FIG. 13 illustrating a flow chart with exemplary steps for actively managing airborne wheels of a vehicle 14 in accordance with an embodiment of the torque limiting system. The vehicle moves on the ground 266 and the speed of the wheels is equal to the speed of the ground, the speed of the vehicle 14 is recorded in the memory module 258 (illustrated in the system of FIG. 12); the vehicle 14 jumps on a jump and becomes airborne 267; the speed of the wheels accelerates given the vehicle 14 is airborne and is still under power 268; the management system of the assisting mechanism detects if the there are airborne wheels using various strategies like by individually or collectively detecting significant suspension extension 269, detecting a significant angular movement (torsion) in the torsion bar 270, detecting no acceleration for a period of time with the accelerometer 271, detecting a significant discrepancy between the actual engine torque and a pre-recorded mapping thereof 272 in function of, for instance, the speed of the vehicle 14, detecting a significant discrepancy between the acceleration of a wheel 42 and a pre-recorded mapping thereof 273 in function of, for instance, the speed of the vehicle 14 and/or detecting a significant discrepancy between the engine acceleration and a pre-recorded mapping thereof considering, for instance, normal road loads 274. The circumferential speed of the wheels 42 before becoming airborne is retrieved from the wheel speed circular memory buffer 275. Then the CVT transmission ratio is set to match the circumferential speed of the wheels with the actual speed of the vehicle 276 and finally the vehicle 14 re-contacts the ground with the circumferential speed of the wheels substantially equal to the vehicle ground speed 277 thus preventing any significant peak of torque in the drive system 38.

An illustrative CVT ratio active control strategy uses a combination of sensors to help distinguishes when a) the vehicle rolls because it is driving into a curve and the wheels 42 on the interior side of the curve lift in the air and lose contact with the ground, and b) when one or more wheels 42 of the vehicle 14 are airborne due to a jump. The sensors will, for example, simultaneously detect extension of the suspensions 46 on both sides of the vehicle 14 when at least one pair of wheels 42 of the vehicle 14 is airborne. These suspension sensors 262 can be disposed either on the front axle of the vehicle 14 or on the rear axle of the vehicle 14. Alternatively, both the front axle and the rear axle of the vehicle 14 can be equipped with respective sensors for a complete diagnostic of driving conditions of the vehicle 14. Other sensors configurations will become apparent to a skilled reader and can be used to make a determination of the state of the vehicle 14 without departing from the scope of the present invention.

As it can be appreciated in FIG. 1 and FIGS. 12-14, a roll bar rotation sensor 296 is operatively affixed to the roll bar 86 to sense the angular position of the roll bar 86 on the vehicle 14. The roll bar rotation sensor 296 is preferably centrally mounted to the roll bar 86 to get equal angular displacement from a right or a left side roll. The roll bar rotation sensor 296 is used to determine when one side of the vehicle 14 is lifted and does not contact the ground anymore due to driving the vehicle 14 through a curve generating significant roll instead of a vertical jump. The roll bar sensor 296 will virtually detect no rotation of the roll bar 86 when the vehicle 14 rolls because the deflection of the suspension on one side is cancelled by the extension of the suspension on the other side of the vehicle 14. Conversely, the roll bar sensor 295 will detect a rotation of the roll bar 86 when the vehicle 14 is airborne because the two sides of the suspension experience an extension. The roll bar sensor 295 can be located elsewhere on the roll bar 86 and still provides valid useful signals despite the movement of one side of the suspension is not equally counterbalanced by the opposite suspension side if properly interpolated.

Further, additional sensors like an engine torque sensor 300 and an engine RPM sensor 320 properly mounted to the engine 62 provide data about the instant state of the engine 62. Each wheel 42 is preferably equipped with a rotation sensor 304 configured to transmit data about the rotational speed of each wheel 42. A vehicle speed sensor 308 is also used to provide data about the speed of the vehicle 14. The vehicle speed can also be obtained from a single wheel rotation sensor 304 or a combination of wheel rotation sensors 304. A significant difference between the rotating speed of the wheels 42 can be an indication that one or many wheels 42 are airborne. A gyroscope 284 can alternatively be used to detect when the vehicle 14 gets airborne with the support of at least one other sensor, like the suspension deflection sensor 262, to distinguish when the vehicle 14 rolls.

All the aforementioned sensors are connected to an input module 324 relaying signals and/or data from each sensor to the computing module 328 to be filtered by the data filter 332 and computed in accordance with an appropriate algorithm. A memory module 258 is also provided to record data therein, like the speed of the vehicle 14, over time. The computed data sends a corrective signal to an output module 336 that relays signals to a power module 340 to power the electric motor 116 schematically illustrated in FIG. 11. The computing module 328 of the present embodiment is further provided with a timer 344 used to "time stamp" various signals received from sensors to be processed later, if required, in accordance with algorithms. The use of the timer 344 will be described in more details in the following explanations.

FIG. 12 is an exemplary illustration of a vehicle 14, seen from the front, equipped with a roll bar rotation sensor 296. As indicated above, the roll bar rotation sensor 296 is preferably located in the middle of the roll bar 86 to prevent inducing errors in the signal. In FIG. 12, the vehicle 14 rests on the ground and the roll bar rotation sensor 296 provides corresponding data to the management module 250 (not illustrated in FIG. 12). The roll bar rotation sensor 296 provides a first logical signal (for instance signal=True) representing the rotation of the roll bar 296 provided by the extension of the suspension 46 on both sides of the vehicle 14 when the vehicle 14 (or at least one wheel 42 thereof) is in acceleration and the wheels 42 attached thereto might be airborne. In contrast, the rotation sensor 296 provides a second signal (for instance signal=False) representing no rotation of the roll bar 296 and maybe indicative of the roll of the vehicle 14. It is understood that the meaning of the respective signals could be exchanged if desired.

An anti-wheelies mechanism could also be embodied using similar principles. For instance, the power of the engine 62 could be reduced if a significant extension of the suspension 46 is monitored. The signals provided by the sensors could be used differently to determine if the front end of the vehicle 14 tends to raise too high.

Figure 14:
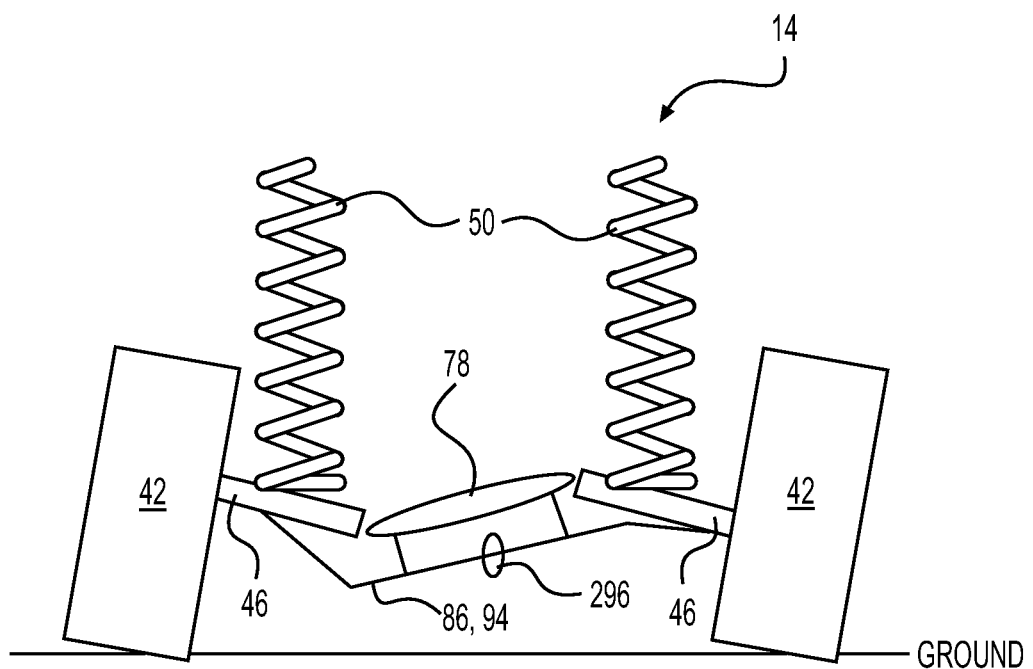
FIG. 14 is a front elevation schematic view a vehicle provided with a roll bar in accordance with an embodiment of the present invention.
Figure 15:
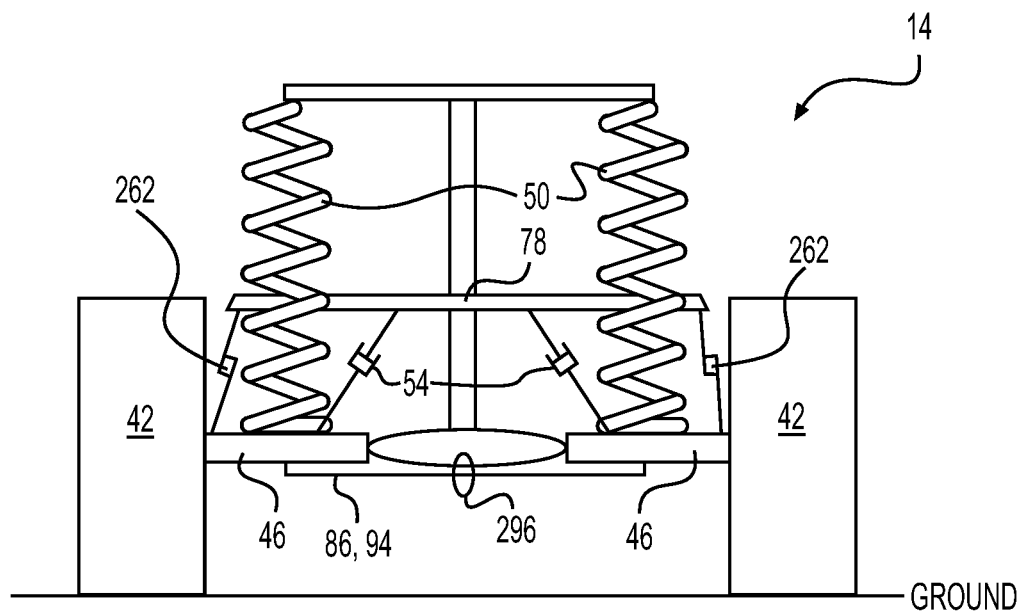
FIG. 15 is a front elevation schematic view a vehicle provide with suspension sensors in accordance with an embodiment of the present invention.

FIG. 13 and FIG. 14 are exemplary illustrations of a vehicle 14, seen from the front, equipped with suspension deflection sensors 262. In FIG. 13, the vehicle 14 rests on the ground and each deflection sensor 262 provides corresponding data to the CVT control module 250. The suspension deflection sensors 262 provide signals representing the compression/extension (or simply the position) of the suspension 46 in respect with the chassis 78 of the vehicle 14. Conversely, FIG. 14 illustrates the same vehicle 14 in an airborne situation where the wheels 42 of the illustrated end of the vehicle have lost contact with the ground. In this embodiment, the suspension deflection sensors 262 provide a signal representing the position of the extended suspension 46 that does not have to bear the weight of the vehicle 14 and have lost motive contact with the ground.

An activation switch 312 schematically illustrated in FIG. 12 is provided to selectively set the CVT transmission into "torque-limiting mode" where the control module 250 actively manages the CVT behaviors based on the sensed signals in order to limit peak torque sustained by the drive mechanism 38 of the vehicle 14. This way it might be desirable to selectively activate or deactivate the circumferential wheel velocity management system. For example, under racing conditions, it could be useful to transform the kinetic energy stored in the rotating wheels 42 when the vehicle 14 is airborne to accelerate faster when touching the ground and dissipating the kinetic energy.

An exemplary embodiment using a virtual sensor strategy is now discussed. A torque-based model can be used in conjunction with the opening of the throttle position sensor (TPS) 316 and the engine rotational speed (RPM) 320 to determine the torque of the engine 62. The TPS and RPM sensors 316, 320 of the engine 62 can be used to infer the torque produced by the engine 62 from a predetermined torque v. engine RPM mapping. Computing is done with known data: the transmission ratio (the instant CVT ratio and the fixed ratio of the optional final gearbox 34 are known), the radius of the wheels 42, the weight of the vehicle 14 and the road load (i.e. the load difference when the vehicle 14 is on the ground and when the vehicle 14 is airborne). Therefore, for a given torque, and provided there is no wheel slip, the wheel acceleration of the drive mechanism 38 of the vehicle 14 is known. As a result, a normal acceleration rate means the vehicle 14 is on the ground because its high road load does not allow a higher acceleration; no circumferential wheel speed correction is thus required. Conversely, a faster acceleration of the wheels 42 means the vehicle 14 is airborne because this acceleration would not be possible with a normal road load; speed correction with the electronically assisted CVT is therefore required.

Figure 17:
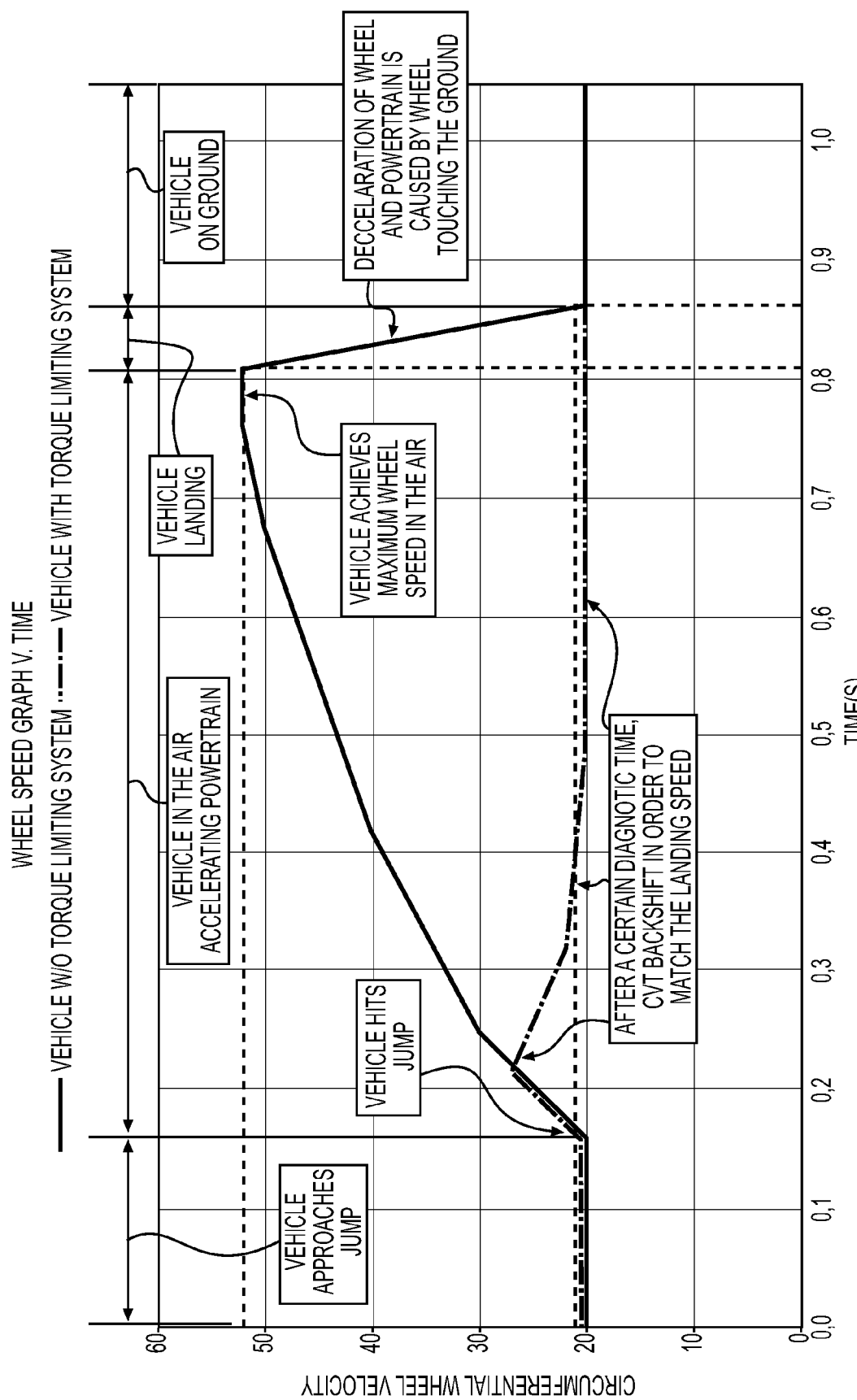
FIG. 17 is an illustrative graph of a vehicle's behaviors in accordance with an embodiment of the present invention.
Figure 18:
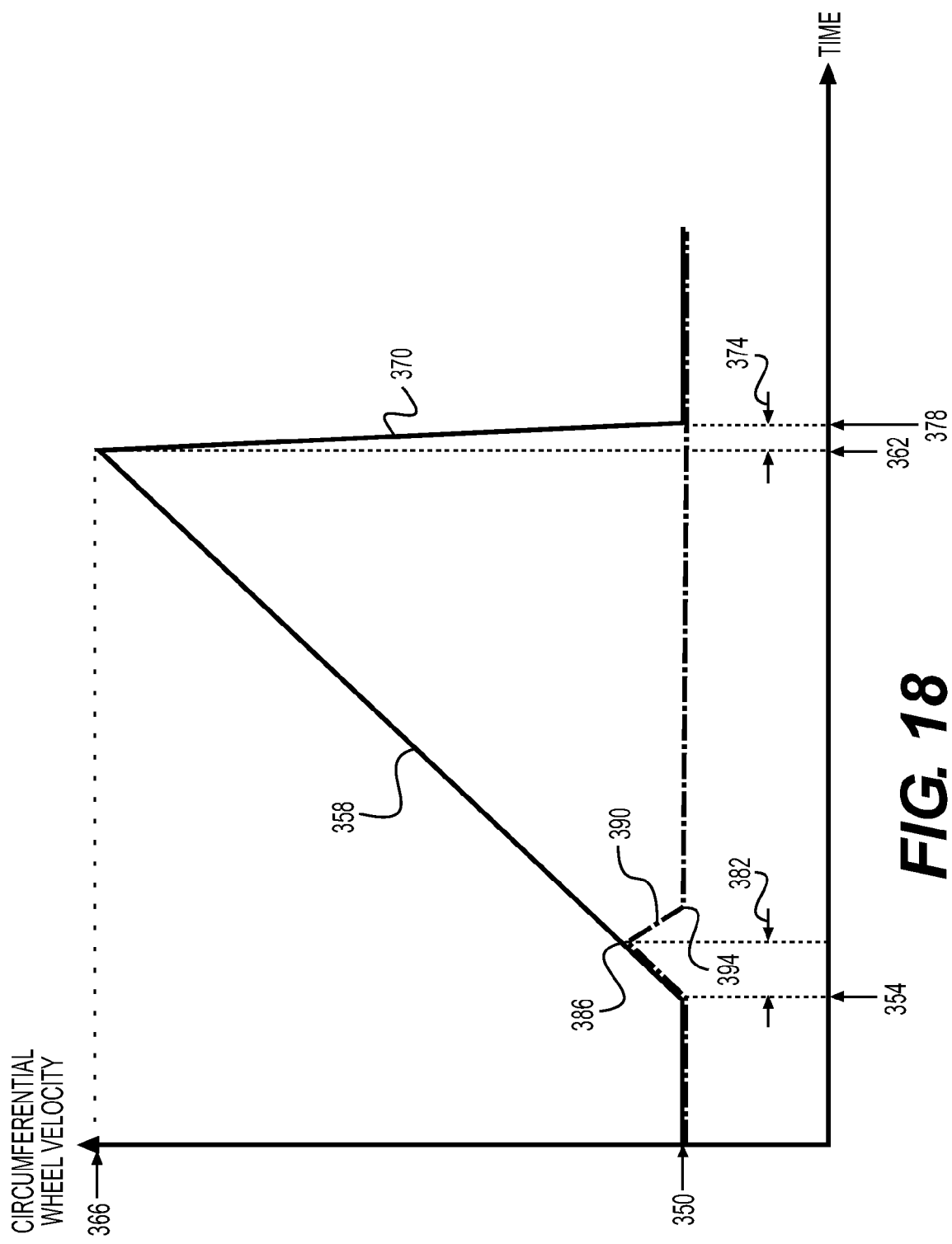
FIG. 18 is an illustrative graph of a vehicle's behaviors in accordance with an embodiment of the present invention where airborne wheels accelerate.

Turning now to FIG. 17 illustrating a typical exemplary graph representing the circumferential wheel 42 velocity in respect with time. The chosen example uses a situation where the airborne wheel 42 accelerates. The same graph is schematically illustrated in FIG. 18. We refer to FIG. 17 and FIG. 18 for the following explanations.

The behavior of the vehicle 14 is illustrated in the graph of FIG. 18. Lets assume the vehicle 14 moves forward on the ground at substantially constant speed indicated by arrow 350 until time indicated by arrow 354 where the vehicle 14 gets airborne and its wheels 42 lose contact with the ground. The user keeps actuating the throttle 316 of and the engine 62 continues to power the wheels 42 despite the wheels are not transferring motive power to the ground to propel the vehicle 14 and are simply freely accelerating in the air. The circumferential wheel velocity continues to increase 358 until they re-contact with the ground at time indicated by arrow 362. At this point the wheels 42 are at their maximum circumferential wheel velocity as indicated by arrow 366. The circumferential wheel velocity reduction 370 is drastic given the very short time indicated by arrow 374 under which deceleration occurs. This is where the drive mechanism 38 of the vehicle 14 is subject to a very high torque given the amount of kinetic energy that has to be dissipated in a very short amount of time. The circumferential wheel velocity gets back to the speed of the vehicle indicated by arrow 350 at time indicated by arrow 378.

Still referring to schematic FIG. 18, and in accordance with an illustrative embodiment of the present invention, the CVT management module 250 uses various inputs provided by various aforementioned sensors to monitor when wheels 42 of the vehicle 14 leaves the ground. This could be made either by monitoring the suspension 46 extension via the suspension deflection sensor 262, detecting circumferential wheel velocity acceleration above a predefined acceptable threshold via the wheels rotation sensor 304 or the accelerometers 294, or detecting discrepancies between a plurality of signals leading to the determination of an airborne vehicle 14. Figuring out if wheels 42 are airborne takes time 382 and the acceleration of the wheels 42 continues 386 until the CVT management module 250 changes the CVT transmission ratio with the electric motor 116 to correct the circumferential wheel velocity 390 until it gets substantially back to the original vehicle speed 394, 350.

As previously mentioned, a vehicle speed log is kept in the memory module 258 and can be accessed by the computing module 250 to find the pre-airborne vehicle speed when desirable. The delay 382 used to recall the pre-airborne vehicle speed is illustratively 0.25 second and consequently the pre-airborne vehicle speed is the speed of the vehicle 0.25 second before it has been determined the vehicle 14 is airborne. The delay 382 helps prevent the assisting mechanism 30 to act on the circumferential wheel velocity in trivial circumstances like a small jump that does not require any circumferential wheel velocity correction.

Figure 19:
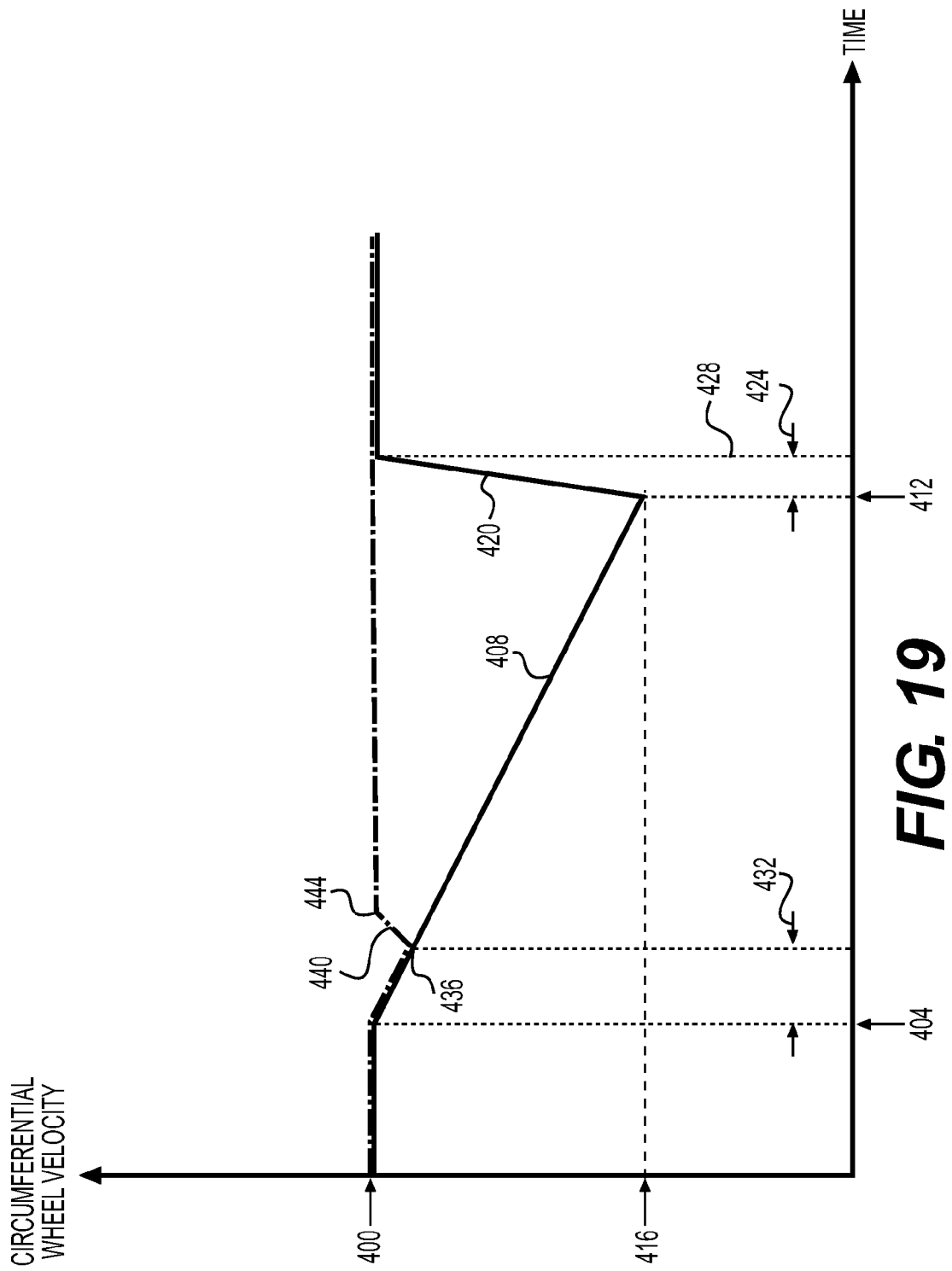
FIG. 19 is an illustrative graph of a vehicle's behaviors in accordance with an embodiment of the present invention where airborne wheels decelerate.

Moving now to FIG. 19 illustrating another exemplary embodiment of the present invention. As opposed to the example of the preceding FIG. 18, the vehicle 14 of the example illustrated in FIG. 19 moves forward on the ground at substantially constant speed indicated by arrow 400 until time indicated by arrow 404 where the vehicle 14 gets airborne on a steep bump and its wheels 42 lose contact with the ground. The engine 62 does not continue to power the wheels 42 and the driver of the vehicle 14 can even apply the brakes to even reduce faster the rotating speed of the wheels 42. The circumferential wheel velocity will decrease 408 until the wheels 42 re-contact the ground at time indicated by arrow 412 when they are at their minimum circumferential wheel velocity 416. The circumferential wheel velocity acceleration 420 is drastic given the very limited time 424 under which it occurs. This is where the drive mechanism 38 of the vehicle 14 is subject to a very high torque given the amount of kinetic energy that has to be absorbed in a very short amount of time, as indicated by arrow 424, by extremely rapidly changing the circumferential wheel velocity. The circumferential wheel velocity gets back to the speed of the vehicle in respect with the ground as indicated by arrow 400 at time indicated by arrow 428. In so doing, the landing of the vehicle 14 is smoother on the drive mechanism 38 because the circumferential wheel velocity has been modified by the electrically controlled CVT 10 to match the vehicle ground speed.

Figure 16:
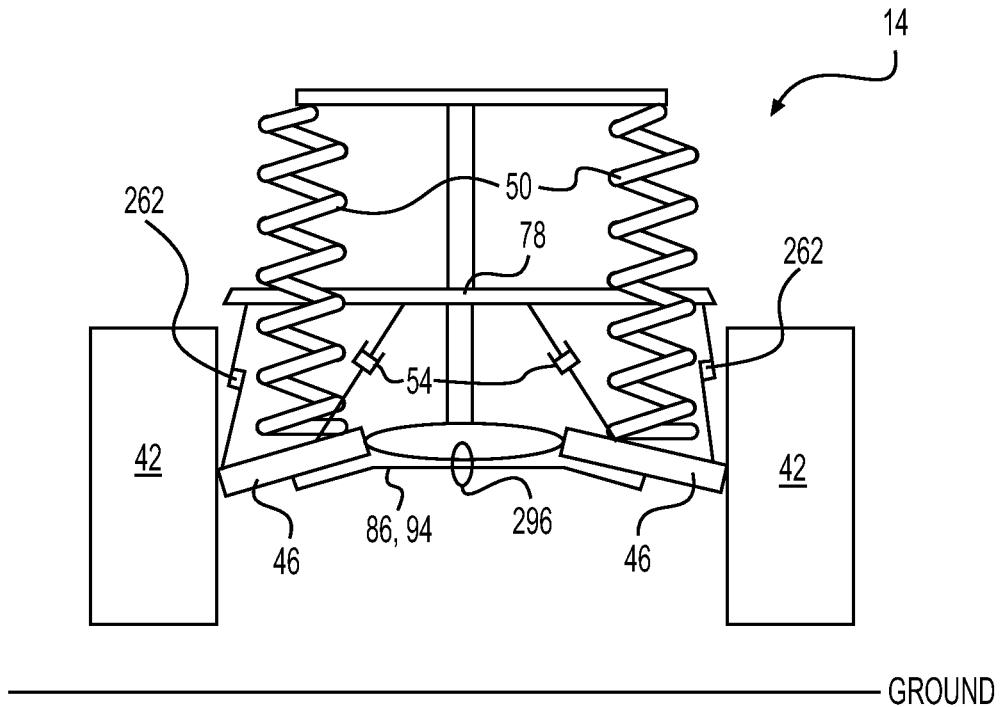
FIG. 16 is a is a front elevation schematic view a vehicle provide with suspension sensors in accordance with an embodiment of the present invention.

Still referring to FIG. 19, and in accordance with an illustrative embodiment of the present invention, the CVT management module 250 uses various inputs from the sensors to monitor when the vehicle 14 leaves the ground as it has been expressed in respect with the illustrative example of FIG. 16 with the difference this time the circumferential wheel velocity is increased by the electronically controlled CVT 10. Put differently, embodiments of the present invention can adjust the circumferential wheel velocity 390, 440 in a situation of acceleration 358 or deceleration 408 of the circumferential wheel velocity when the vehicle 14 loses contact with the ground.

Another way to determine if the vehicle 14 is airborne consists in detecting the acceleration of the vehicle 14 with the accelerometer(s) 294. The system can consider the vehicle 14 is airborne if the vehicle has an acceleration close to zero (0). Sensing the extension of the suspension 46 in addition to monitoring the acceleration can help to further determine if the vehicle 14 is airborne and not only running at constant speed.

The description and the drawings that are presented above are meant to be illustrative of the present invention. They are not meant to be limiting of the scope of the present invention. Modifications to the embodiments described may be made without departing from the present invention, the scope of which is defined by the following claims:

The invention claimed is:

1. An electronically controlled CVT for managing a transmission ratio between an engine and a rotatable ground-contacting member of a vehicle, the electronically controlled CVT comprising:
   a drive portion comprising a drive pulley including two opposed sheaves;
   an assisting mechanism for managing the transmission ratio by changing the distance between the two opposed sheaves for reducing a discrepancy between a vehicle speed and the peripheral speed of an airborne rotatable ground-contacting member;
   receiving a signal from a sensor disposed on the vehicle to determine if the rotatable ground contacting member is airborne;
   determining a desired circumferential speed of the rotatable ground-contacting member; and
   sending a signal indicative of the desired circumferential speed of the ground-contacting member to the electronically controlled CVT;
wherein the sent signal is material for setting the transmission ratio for reducing the discrepancy between the vehicle speed and the circumferential speed of the airborne ground-contacting member.

2. The electronically controlled CVT of claim 1, further comprising a memory adapted to store data therein representing a speed of the vehicle along time.

3. The electronically controlled CVT of claim 2, further comprising recording the speed of the vehicle along time.

4. The electronically controlled CVT of claim 3, further comprising recalling a recorded speed of the vehicle for setting the transmission ratio.

5. The electronically controlled CVT of claim 4, wherein the recalled speed of the vehicle is the speed of the vehicle about the time the ground-contacting member gets airborne.

6. The electronically controlled CVT of claim 1, the received signal is representing a roll of the vehicle.

7. The electronically controlled CVT of claim 1, wherein the sensor is adapted to sense a position of a suspension of the vehicle.

8. The electronically controlled CVT of claim 1, wherein the sensor is an accelerometer adapted to sense the vehicle's acceleration.

9. A vehicle including an electronically controlled CVT for managing a transmission ratio between an engine and a ground-contacting rotating member of a vehicle, the electronically controlled CVT comprising:
   a drive portion comprising a drive pulley including two opposed sheaves;
   an assisting mechanism for adjusting the distance between the two opposed sheaves of an electronically assisted CVT for reducing a discrepancy between a vehicle speed and the circumferential speed of the airborne rotatable ground-contacting member;
   receiving a signal from a sensor disposed on the vehicle to determine if the rotatable ground contacting member is airborne;
   determining a desired circumferential speed of the rotatable ground-contacting member; and
   sending a signal indicative of the desired circumferential speed of the ground-contacting member to the electronically controlled CVT,
wherein the sent signal is material for setting the transmission ratio for reducing the discrepancy between the vehicle speed and the circumferential speed of the airborne ground-contacting member.

10. The vehicle of claim 9, further comprising a memory adapted to store data therein representing a speed of the vehicle along time.

11. The vehicle of claim 10, further comprising recording the speed of the vehicle along time.

12. The vehicle of claim 11, further comprising recalling a recorded speed of the vehicle for setting the transmission ratio.

13. The vehicle of claim 12, wherein the recalled speed of the vehicle is the speed of the vehicle about the time the ground-contacting member gets airborne.

14. The vehicle of claim 9, the received signal is representing a roll of the vehicle.

15. The vehicle of claim 9, wherein the sensor is adapted to sense a position of a suspension of the vehicle.

16. The vehicle of claim 9, wherein the sensor is an accelerometer adapted to sense the vehicle's acceleration.

17. A computer-readable medium comprising computer readable instructions stored thereon, the instructions, when executed, providing a method comprising:
   sensing a vehicle speed;
   determining when a ground-contacting member supporting the vehicle is airborne;
   managing an actuation mechanism setting a transmission ratio of an electronically assisted CVT on the vehicle to substantially match a circumferential velocity of the ground-contacting member with the vehicle speed;
   recording the vehicle speed; and
   retrieving a recorded vehicle speed,
wherein the circumferential velocity of the ground-contacting member is matched with the retrieved recorded vehicle speed.

* * * * *